(12) United States Patent
Taherzadeh Boroujeni et al.

(10) Patent No.: US 12,267,271 B2
(45) Date of Patent: Apr. 1, 2025

(54) DOWNLINK TRANSMISSION REPETITION TECHNIQUES IN WIRELESS COMMUNICATIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 17/565,007

(22) Filed: Dec. 29, 2021

(65) Prior Publication Data

US 2022/0239441 A1 Jul. 28, 2022

Related U.S. Application Data

(60) Provisional application No. 63/141,369, filed on Jan. 25, 2021.

(51) Int. Cl.
*H04W 72/12* (2023.01)
*H04L 1/08* (2006.01)
*H04L 5/00* (2006.01)
*H04W 72/1273* (2023.01)

(52) U.S. Cl.
CPC .............. *H04L 5/0053* (2013.01); *H04L 1/08* (2013.01); *H04W 72/1273* (2013.01)

(58) Field of Classification Search
CPC ....... H04L 5/0053; H04L 1/08; H04L 1/0009; H04L 5/0048; H04L 5/0091; H04W 72/1273; H04W 72/23; H04W 74/0833
See application file for complete search history.

(56) References Cited

U.S. PATENT DOCUMENTS

| | | | |
|---|---|---|---|
| 2018/0279145 A1* | 9/2018 | Jung | H04B 17/382 |
| 2020/0022144 A1* | 1/2020 | Papasakellariou | H04W 72/23 |
| 2021/0076384 A1* | 3/2021 | MolavianJazi | H04B 17/318 |
| 2022/0006575 A1* | 1/2022 | Cozzo | H04W 72/046 |
| 2022/0070940 A1* | 3/2022 | Taherzadeh Boroujeni | H04L 5/005 |
| 2022/0191940 A1* | 6/2022 | MolavianJazi | H04B 17/318 |
| 2022/0210844 A1* | 6/2022 | MolavianJazi | H04W 74/0841 |
| 2022/0225319 A1* | 7/2022 | Khoshnevisan | H04W 72/0453 |

(Continued)

*Primary Examiner* — Jay P Patel
(74) *Attorney, Agent, or Firm* — Dalei Dong; Holland & Hart LLP

(57) ABSTRACT

Methods, systems, and devices for wireless communications are described that provide for discontinuation of repetitions of downlink communications based on an indication provided as part of a network access procedure. The discontinuation or repetitions may be responsive to a presence of one or more enhancement techniques that provide for higher likelihood of successful communications with fewer instances of downlink transmissions, such as one or more reference signal transmissions that are associated with the network access procedure. A base station may transmit an indication of a termination of a downlink communication, which reduces a number of repetitions of the downlink communication. The indication of the termination may be an indication that a channel state information reference signal (CSI-RS) or a sounding reference signal (SRS) is scheduled before or during the network access procedure.

30 Claims, 20 Drawing Sheets

(56) References Cited

U.S. PATENT DOCUMENTS

| | | | |
|---|---|---|---|
| 2022/0239441 A1* | 7/2022 | Taherzadeh Boroujeni | ................ H04L 5/0053 |
| 2023/0156807 A1* | 5/2023 | Lei | ........................ H04W 72/12 370/329 |
| 2023/0189232 A1* | 6/2023 | Rastegardoost | ...... H04L 5/0053 370/329 |
| 2023/0209485 A1* | 6/2023 | Wei | ................... H04W 56/0015 370/503 |
| 2024/0267918 A1* | 8/2024 | Zhang | ................... H04L 5/0078 |

* cited by examiner

DOWNLINK TRANSMISSION REPETITION TECHNIQUES IN WIRELESS COMMUNICATIONS

CROSS REFERENCE

The present application for patent claims the benefit of U.S. Provisional Patent Application No. 63/141,369 by TAHERZADEH BOROUJENI et al., entitled "DOWNLINK TRANSMISSION REPETITION TECHNIQUES IN WIRELESS COMMUNICATIONS," filed Jan. 25, 2021, assigned to the assignee hereof, and expressly incorporated by reference herein.

FIELD OF TECHNOLOGY

The following relates to wireless communications, including downlink transmission repetition techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some deployments, relatively poor channel conditions may be present between a UE and a base station, which may result in a lower likelihood of successful reception of one or more communications between the UE and base station. In order to enhance the likelihood of successful receipt of such communications, multiple instances of a communication may be transmitted to enhance the likelihood of successfully decoding the communication at a receiving device. Each additional repetition of a communication consumes additional wireless resources and thus it is desirable to use multiple repetitions of transmissions in cases where such repetitions are necessary to provide reliable communications. Thus, efficient techniques for transmitting and receiving repetitions for a communication may enhance the reliability and provide for efficient resource usage of a wireless communications system.

SUMMARY

The described techniques relate to improved methods, systems, devices, and apparatuses that support downlink transmission repetition techniques in wireless communications. Various aspects of the present disclosure provide for discontinuation of repetitions of downlink communications based on a presence of one or more enhancement techniques that provide for higher likelihood of successful communications with fewer instances of downlink transmissions. In some cases, the one or more enhancement techniques include one or more reference signal transmissions that are associated with a network access procedure. In some cases, a base station may transmit an indication of a termination of a downlink communication, which reduces a number of repetitions of the downlink communication. In some cases, the indication of the termination may be an indication that a reference signal transmission is scheduled before or during the network access procedure.

In some cases, if a channel state information reference signal (CSI-RS) is transmitted before or during an access procedure (e.g., an initial access procedure or a random access channel (RACH) procedure), repetitions of one or more downlink control channel (e.g., physical downlink control channel (PDCCH)) transmissions may be discontinued. Additionally or alternatively, if a sounding reference signal (SRS) is transmitted before or during an access procedure (e.g., initial access or RACH procedure), repetitions of one or more downlink control channel (e.g., PDCCH) transmissions may be discontinued. The PDCCH transmissions may include, for example, a message-2 or message-4 transmission of an initial access or RACH procedure, multiple repetitions of which may be transmitted in an absence of the indication of the termination of the downlink transmission (e.g., in an absence of one or more enhancement techniques).

A method for wireless communication at a user equipment is described. The method may include receiving, from a base station, a first indication that a communications enhancement is scheduled prior to at least one instance of a downlink communication of a random access procedure, where, in an absence of the first indication, the downlink communication is scheduled to be transmitted in a set of repetitions that includes two or more instances of the downlink communication that are associated with different downlink resources of a set of multiple downlink resources and monitoring, responsive to the first indication, a subset of the set of multiple downlink resources for a subset of the set of repetitions of the downlink communication.

An apparatus for wireless communication at a user equipment is described. The apparatus may include a processor, memory coupled with the processor, and instructions stored in the memory. The instructions may be executable by the processor to cause the apparatus to receive, from a base station, a first indication that a communications enhancement is scheduled prior to at least one instance of a downlink communication of a random access procedure, where, in an absence of the first indication, the downlink communication is scheduled to be transmitted in a set of repetitions that includes two or more instances of the downlink communication that are associated with different downlink resources of a set of multiple downlink resources and monitor, responsive to the first indication, a subset of the set of multiple downlink resources for a subset of the set of repetitions of the downlink communication.

Another apparatus for wireless communication at a user equipment is described. The apparatus may include means for receiving, from a base station, a first indication that a communications enhancement is scheduled prior to at least one instance of a downlink communication of a random access procedure, where, in an absence of the first indication, the downlink communication is scheduled to be transmitted in a set of repetitions that includes two or more instances of the downlink communication that are associated with different downlink resources of a set of multiple downlink resources and means for monitoring, responsive to the first indication, a subset of the set of multiple downlink resources for a subset of the set of repetitions of the downlink communication.

A non-transitory computer-readable medium storing code for wireless communication at a user equipment is described. The code may include instructions executable by a processor to receive, from a base station, a first indication that a communications enhancement is scheduled prior to at least one instance of a downlink communication of a random access procedure, where, in an absence of the first indication, the downlink communication is scheduled to be transmitted in a set of repetitions that includes two or more instances of the downlink communication that are associated with different downlink resources of a set of multiple downlink resources and monitor, responsive to the first indication, a subset of the set of multiple downlink resources for a subset of the set of repetitions of the downlink communication.

In some examples of the method, apparatuses, and non-transitory computer-readable medium described herein, the receiving the first indication may include operations, features, means, or instructions for receiving scheduling information for a channel state information reference signal (CSI-RS) that are to be measured at the user equipment (UE) during or before the random access procedure. In some examples of the method, apparatuses, and non-transitory computer-readable medium described herein, the monitoring may include operations, features, means, or instructions for monitoring for a random access response message on the subset of the set of multiple downlink resources based on the channel state information (CSI)-RS scheduling information, where the subset of the set of multiple downlink resources are associated with fewer instances of the downlink communication than the set of multiple downlink resources. In some examples of the method, apparatuses, and non-transitory computer-readable medium described herein, the random access response message may be a message-2 transmission, and where a message-4 downlink control channel message may be transmitted subsequent to the message-2 transmission using fewer repetitions than a total number of repetitions of the set of repetitions.

In some examples of the method, apparatuses, and non-transitory computer-readable medium described herein, the first indication may be a random access response from the base station that is transmitted responsive to a random access request of the UE, where the random access response schedules a sounding reference signal (SRS) transmission from the UE. In some examples of the method, apparatuses, and non-transitory computer-readable medium described herein, the downlink communication may be monitored on the subset of the set of multiple downlink resources based on the SRS transmission, and where the subset of the set of multiple downlink resources are associated with fewer instances of the downlink communication than the set of multiple downlink resources.

In some examples of the method, apparatuses, and non-transitory computer-readable medium described herein, a number of repetitions of the downlink communication that are monitored at the UE is modified responsive to the first indication based on a set of predefined rules for the number of repetitions of the downlink communication. Some examples of the method, apparatuses, and non-transitory computer-readable medium described herein may further include operations, features, means, or instructions for receiving, from the base station, a system information communication that includes one or more parameters that identify a total number of repetitions of the set of repetitions that are to be monitored at the UE.

Some examples of the method, apparatuses, and non-transitory computer-readable medium described herein may further include operations, features, means, or instructions for transmitting a first communication to the base station, where a total number of repetitions of the set of repetitions are determined based on a first rule associated with the first communication, and where a second rule associated with the first indication provides an exception to the total number of repetitions of the set of repetitions that are to be monitored at the UE. In some examples of the method, apparatuses, and non-transitory computer-readable medium described herein, the first rule indicates that the UE is to monitor for repetitions of the downlink communication when the first communication is transmitted using multiple repetitions, and the second rule indicates that the UE is to discontinue monitoring for multiple instances of the downlink communication when an initial access enhancement or a random access enhancement is present.

In some examples of the method, apparatuses, and non-transitory computer-readable medium described herein, the initial access enhancement or the random access enhancement is based on one or more channel measurements that are enabled by the reference signal transmission. In some examples of the method, apparatuses, and non-transitory computer-readable medium described herein, a number of instances of the downlink communication that are to be transmitted are identified based on a parameter that is provided with system information that indicates the initial access enhancement or the random access enhancement. In some examples of the method, apparatuses, and non-transitory computer-readable medium described herein, the subset of the set of repetitions of the downlink communication includes fewer repetitions than the set of repetitions, or no repetitions of the downlink communication subsequent to an initial transmission of the downlink communication.

A method for wireless communication at a base station is described. The method may include transmitting, to a UE, a first indication that a communications enhancement is scheduled prior to at least one instance of a downlink communication of a random access procedure, where, in an absence of the first indication, the downlink communication is scheduled to be transmitted in a set of repetitions that includes two or more instances of the downlink communication that are associated with different downlink resources of a set of multiple downlink resources and transmitting, responsive to the first indication, a subset of the set of repetitions of the downlink communication using a subset of the set of multiple downlink resources.

An apparatus for wireless communication at a base station is described. The apparatus may include a processor, memory coupled with the processor, and instructions stored in the memory. The instructions may be executable by the processor to cause the apparatus to transmit, to a UE, a first indication that a communications enhancement is scheduled prior to at least one instance of a downlink communication of a random access procedure, where, in an absence of the first indication, the downlink communication is scheduled to be transmitted in a set of repetitions that includes two or more instances of the downlink communication that are associated with different downlink resources of a set of multiple downlink resources and transmit, responsive to the first indication, a subset of the set of repetitions of the downlink communication using a subset of the set of multiple downlink resources.

Another apparatus for wireless communication at a base station is described. The apparatus may include means for transmitting, to a UE, a first indication that a communications enhancement is scheduled prior to at least one instance of a downlink communication of a random access procedure, where, in an absence of the first indication, the downlink communication is scheduled to be transmitted in a set of repetitions that includes two or more instances of the downlink communication that are associated with different downlink resources of a set of multiple downlink resources and means for transmitting, responsive to the first indication, a subset of the set of repetitions of the downlink communication using a subset of the set of multiple downlink resources.

A non-transitory computer-readable medium storing code for wireless communication at a base station is described. The code may include instructions executable by a processor to transmit, to a UE, a first indication that a communications enhancement is scheduled prior to at least one instance of a downlink communication of a random access procedure, where, in an absence of the first indication, the downlink communication is scheduled to be transmitted in a set of repetitions that includes two or more instances of the downlink communication that are associated with different downlink resources of a set of multiple downlink resources and transmit, responsive to the first indication, a subset of the set of repetitions of the downlink communication using a subset of the set of multiple downlink resources.

In some examples of the method, apparatuses, and non-transitory computer-readable medium described herein, the transmitting the first indication may include operations, features, means, or instructions for transmitting scheduling information for a channel state information reference signal (CSI-RS) that are to be measured at the UE during or before the random access procedure. In some examples of the method, apparatuses, and non-transitory computer-readable medium described herein, the transmitting the subset of the set of repetitions may include operations, features, means, or instructions for transmitting a random access response message using the subset of the set of multiple downlink resources based on the CSI-RS scheduling information, where the subset of the set of multiple downlink resources are associated with fewer instances of the downlink communication than the set of multiple downlink resources.

In some examples of the method, apparatuses, and non-transitory computer-readable medium described herein, the random access response message may be a message-2 transmission, and where a message-4 downlink control channel message may be transmitted subsequent to the message-2 transmission using fewer repetitions than a total number of repetitions of the set of repetitions. In some examples of the method, apparatuses, and non-transitory computer-readable medium described herein, the first indication may be a random access response from the base station that is transmitted responsive to a random access request of the UE, where the random access response schedules an SRS transmission from the UE. In some examples of the method, apparatuses, and non-transitory computer-readable medium described herein, the downlink communication is transmitted on the subset of the set of multiple downlink resources based on the SRS transmission, and where the subset of the set of multiple downlink resources are associated with fewer instances of the downlink communication than the set of multiple downlink resources.

In some examples of the method, apparatuses, and non-transitory computer-readable medium described herein, a number of repetitions of the downlink communication that are transmitted to the UE are modified responsive to the first indication based on a set of predefined rules for the number of repetitions of the downlink communication. Some examples of the method, apparatuses, and non-transitory computer-readable medium described herein may further include operations, features, means, or instructions for transmitting a system information communication that includes one or more parameters that identify a total number of repetitions of the set of repetitions that are to be monitored at the UE.

Some examples of the method, apparatuses, and non-transitory computer-readable medium described herein may further include operations, features, means, or instructions for receiving, from the UE, a first communication, where a total number of repetitions of the set of repetitions may be determined based on a first rule associated with the first communication, and where a second rule associated with the first indication provides an exception to the total number of repetitions of the set of repetitions that are to be transmitted to the UE. In some examples of the method, apparatuses, and non-transitory computer-readable medium described herein, the first rule indicates that the UE is to monitor for repetitions of the downlink communication when the first communication is transmitted using multiple repetitions, and the second rule indicates that the UE is to discontinue monitoring for multiple instances of the downlink communication when an initial access enhancement or a random access enhancement is present.

In some examples of the method, apparatuses, and non-transitory computer-readable medium described herein, the initial access enhancement or the random access enhancement are based on one or more channel measurements that are enabled by the reference signal transmission. In some examples of the method, apparatuses, and non-transitory computer-readable medium described herein, a number of instances of the downlink communication that are to be transmitted are identified based on a parameter that is provided with system information that indicates the initial access enhancement or the random access enhancement. In some examples of the method, apparatuses, and non-transitory computer-readable medium described herein, the subset of the set of repetitions of the downlink communication includes fewer repetitions than the set of repetitions, or no repetitions of the downlink communication subsequent to an initial transmission of the downlink communication.

DETAILED DESCRIPTION

Figure 1:
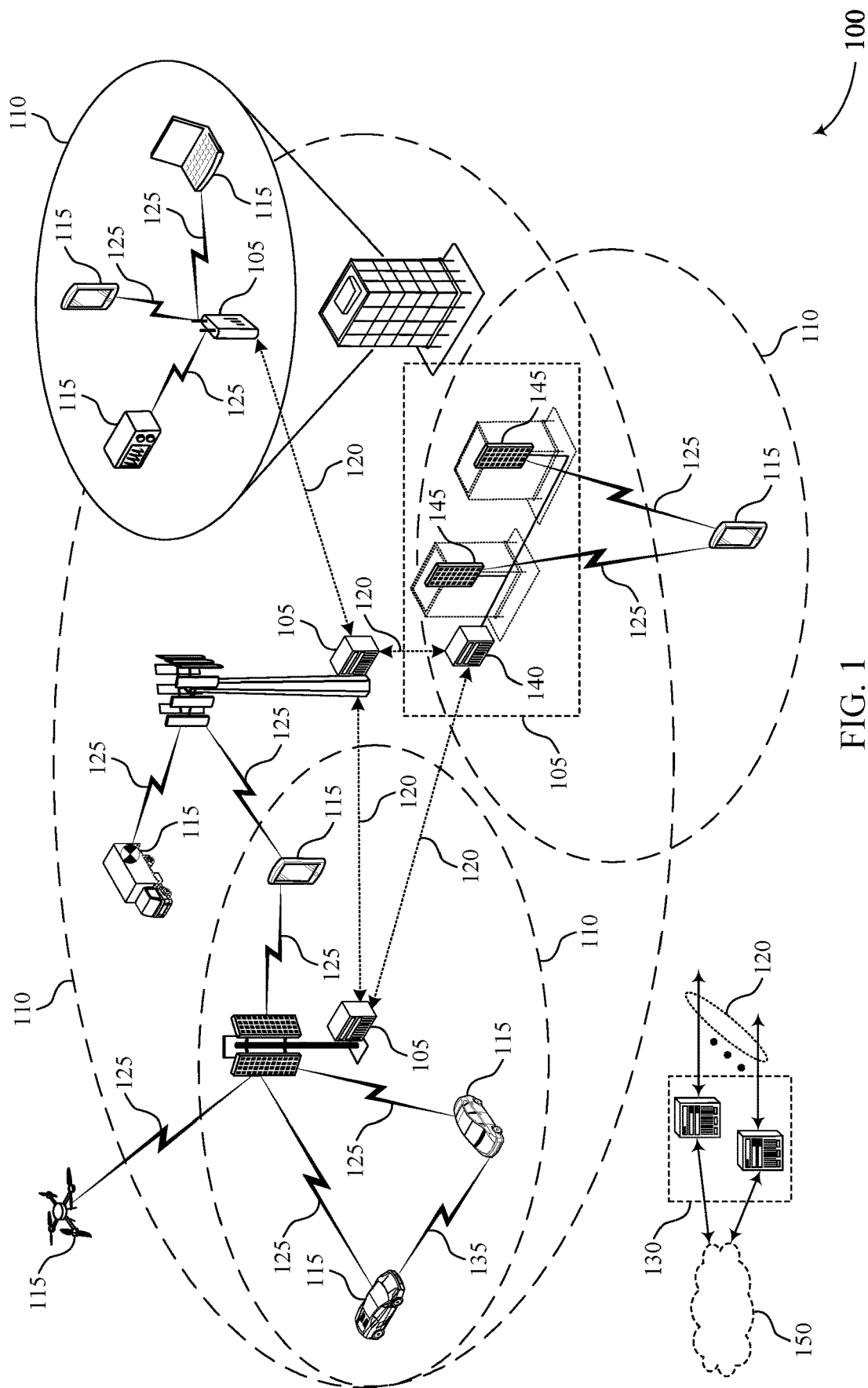
FIG. 1 illustrates an example of a wireless communications system that supports downlink transmission repetition techniques in wireless communications in accordance with aspects of the present disclosure.

In some wireless communications systems, coverage enhancement techniques may be implemented to compensate for a presence of relatively poor channel conditions between a user equipment (UE) and a base station. For example, relatively poor channel conditions may result in a lower likelihood of successful reception of one or more communications between the UE and base station, and coverage enhancement techniques may be used to enhance the likelihood of successful receipt of such communications. In some cases, coverage enhancement techniques may provide multiple repetitions of a communication to enhance the likelihood of successfully decoding the communication at a receiving device. For example, in an initial access or random access channel (RACH) procedure, one or more downlink transmissions from a base station to a UE may use coverage enhancement to meet reliability targets. Such downlink transmissions may be broadcast control channel transmissions (e.g., broadcast physical downlink control channel (PDCCH) transmissions) that may appear in different stages of initial access or RACH procedures, such as a broadcast PDCCH that provides remaining minimum system information (RMSI), a random access response PDCCH (e.g., a RACH MSG-2) transmission, or a random access connection setup PDCCH (e.g., a RACH MSG-4) transmission. Such coverage enhancement techniques may be used in any of a number of situations in which a link quality between the UE and the base station may be relatively poor (e.g., in initial access procedures in frequency range 2 (FR2) in which relatively wide beams may be used for broadcast PDCCH).

In accordance with various aspects of the present disclosure, repetitions of some downlink communications may be terminated based on a presence or absence of one or more communications enhancements that are associated with a random access or initial access procedure. Such communications enhancements may include, for example, reference signal transmissions (e.g., channel state information reference signal (CSI-RS) or sounding reference signal (SRS) transmissions) that are made prior to or during a random access or initial access procedure. Such reference signal transmissions may enable channel measurements that can be used to modify one or more transmit or receive parameters for a subsequent downlink communication, which may enhance the likelihood of successful decoding of the transmission to a point where multiple repetitions of the transmission may not be needed. Thus, in cases where an additional communications enhancement (e.g., a CSI-RS or SRS transmission) is present, an associated random access or initial access procedure may have a reduced number of repetitions or no additional repetitions of a downlink communication after an initial transmission of the downlink communication.

Such techniques may provide for increased reliability for downlink communications (e.g., PDCCH transmissions of a random access procedure), and also provide for reduced wireless resource usage associated with multiple repetitions of a communication. Thus, techniques such as discussed herein provide for enhanced reliability in wireless communications, as well as power savings and reduced resource usage through termination of a downlink transmission (e.g., transmitting no or fewer repetitions of the downlink transmission subsequent to an initial instance of the downlink transmission) in the event that one or more communication enhancements associated with a random access or initial access procedure are present. Such techniques may also provide for increased network capacity and throughput through efficient usage of wireless resources, thus providing an enhanced user experience.

Aspects of the disclosure are initially described in the context of wireless communications systems. Various process flows associated with exemplary techniques are then discussed. Aspects of the disclosure are further illustrated by and described with reference to apparatus diagrams, system diagrams, and flowcharts that relate to downlink transmission repetition techniques in wireless communications.

FIG. 1 illustrates an example of a wireless communications system 100 that supports downlink transmission repetition techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE- SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, base stations 105 and UEs 115 may use coverage enhancement techniques, such as providing multiple repetitions of communications, to enhance reliability of communications. In some cases, a UE 115 and base station 105 may determine that repetitions of downlink communications may be terminated based on a presence of one or more communications enhancements that provide for higher likelihood of successful communications with fewer repetitions of the downlink communications. In some cases, the one or more communications enhancement techniques include one or more reference signal transmissions that are associated with a network access procedure (e.g., a random access or initial access procedure). Other types of communications enhancement techniques may also trigger modification of repetitions, such as power boosting of downlink communications associated with a random access or initial access procedure. In some cases, if a reference signal transmission is scheduled before or during the network access procedure, a number of repetitions of one or more communications (e.g., broadcast PDCCH transmissions) associated with the network access procedure may be reduced.

In some cases, if a CSI-RS is transmitted before or during an access procedure, repetitions of one or more downlink control channel (e.g., PDCCH) transmissions may be terminated (e.g., no repetitions after an initial instance of the PDCCH transmission, or fewer repetitions of the PDCCH transmissions). Additionally or alternatively, if a SRS is transmitted before or during an access procedure (e.g., initial access or RACH procedure), repetitions of one or more downlink control channel (e.g., PDCCH) transmissions may be terminated. The PDCCH transmissions may include, for example, a message-2 or message-4 transmission of an initial access or RACH procedure (e.g., RACH MSG-2 or MSG-4), multiple repetitions of which may be transmitted in an absence of an indication of the presence of the one or more communication enhancement techniques.

Figure 2:
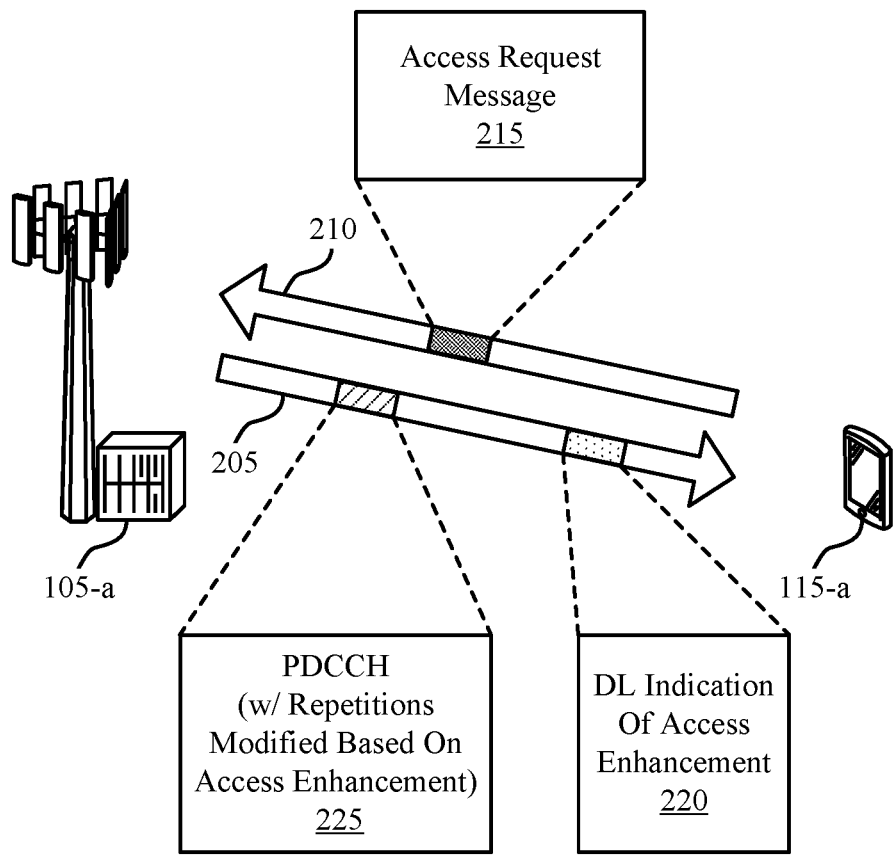
FIG. 2 illustrates an example of a portion of a wireless communications system that supports downlink transmission repetition techniques in wireless communications in accordance with aspects of the present disclosure.

FIG. 2 illustrates an example of a wireless communications system 200 that supports downlink transmission repetition techniques in wireless communications in accordance with aspects of the present disclosure. In some examples, wireless communications system 200 may implement aspects of wireless communications system 100. For example, the wireless communications system 200 may include a base station 105-*a* and a UE 115-*a*, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems. The wireless communications system 200 may include features for improvements to communications reliability and resource usage, power savings and, in some examples, may promote high reliability and low latency uplink operations, among other benefits.

In the example of FIG. 2, the base station 105-*a* may transmit downlink communications to the UE 115-*a* via a downlink connection 205 and the UE 115-*a* may transmit uplink communications to the base station 105-*a* via an uplink connection 210. In some cases, when the UE 115-a performs a network access procedure such as a RACH procedure or an initial access procedure, coverage enhancement techniques may be used for one or more uplink communications, one or more downlink communications, or combinations thereof. For example, the base station 105-a may transmit one or more SSBs that the UE 115-a may monitor for system information, which may include one or more broadcast PDCCH transmissions that indicate remaining minimum system information (RMSI), multiple repetitions of which may be transmitted in order to enhance the likelihood of successful reception and decoding at the UE 115-a. Similarly, in some examples, the UE 115-a may transmit an access request message 215 to the base station 105-a to request network access (e.g., an initial access or RACH request), multiple repetitions of which may be transmitted in order to enhance the likelihood of successful reception and decoding at the base station 105-a. In some cases, when multiple repetitions of the access request message 215 are transmitted, the UE 115-a may expect that multiple repetitions of subsequent PDCCH transmissions will be transmitted, such as RACH MSG-2 or MSG-4 transmissions.

In accordance with various techniques provided herein, the base station 105-a and the UE 115-a may use one or multiple enhancements that may enhance the reliability of such subsequent PDCCH transmissions. In the event that such enhancements are present, the base station 105-a may transmit a downlink indication of access enhancement 220. The downlink indication of access enhancement 220 may indicate to the UE 115-a that one or more reference signals are scheduled that are associated with the access request (e.g., a CSI-RS or a SRS), or may indicate some other enhancement (e.g., power boosting, different coding rate, or other technique that may enhance reliability of broadcast PDCCH). Based on the downlink indication of access enhancement 220, which may be an example of an indication of a termination of a downlink communication, the base station 105-a may transmit and the UE 115-a may monitor for PDCCH transmission(s) 225, a number of repetitions of which may be modified based on the downlink indication of access enhancement 220.

In some cases, if the UE 115-a expects that PDCCH repetitions are to be transmitted, the downlink indication of access enhancement 220 may provide an indication that CSI-RS or SRS are scheduled that are associated with the access request PDCCH transmission 225 repetitions, the UE 115-a may implicitly modify the number of repetitions of PDCCH transmission 225 that are expected. For example, in some cases the scheduling of CSI-RS via RMSI may deactivate repetition of MSG-2 on PDCCH, or scheduling of SRS via MSG-2 may deactivate repetition of MSG-4 on PDCCH. In some cases, rules for implicit indication of PDCCH repetition modification may be predefined or may be indicated in system information (e.g., RMSI), such as by an indication of one or more parameters that trigger implicit PDCCH repetition modification. In some cases, the communications enhancements may be used when the UE 115-a and base station 105-a communicate in high frequency ranges (e.g., FR2 or FR4), and may not be used when the UE 115-a and base station 105-a use lower frequency ranges (e.g., FR1). In other cases, the communications enhancements may be used in all frequency ranges in which the UE 115-a and base station 105-a may operate.

Figure 3:
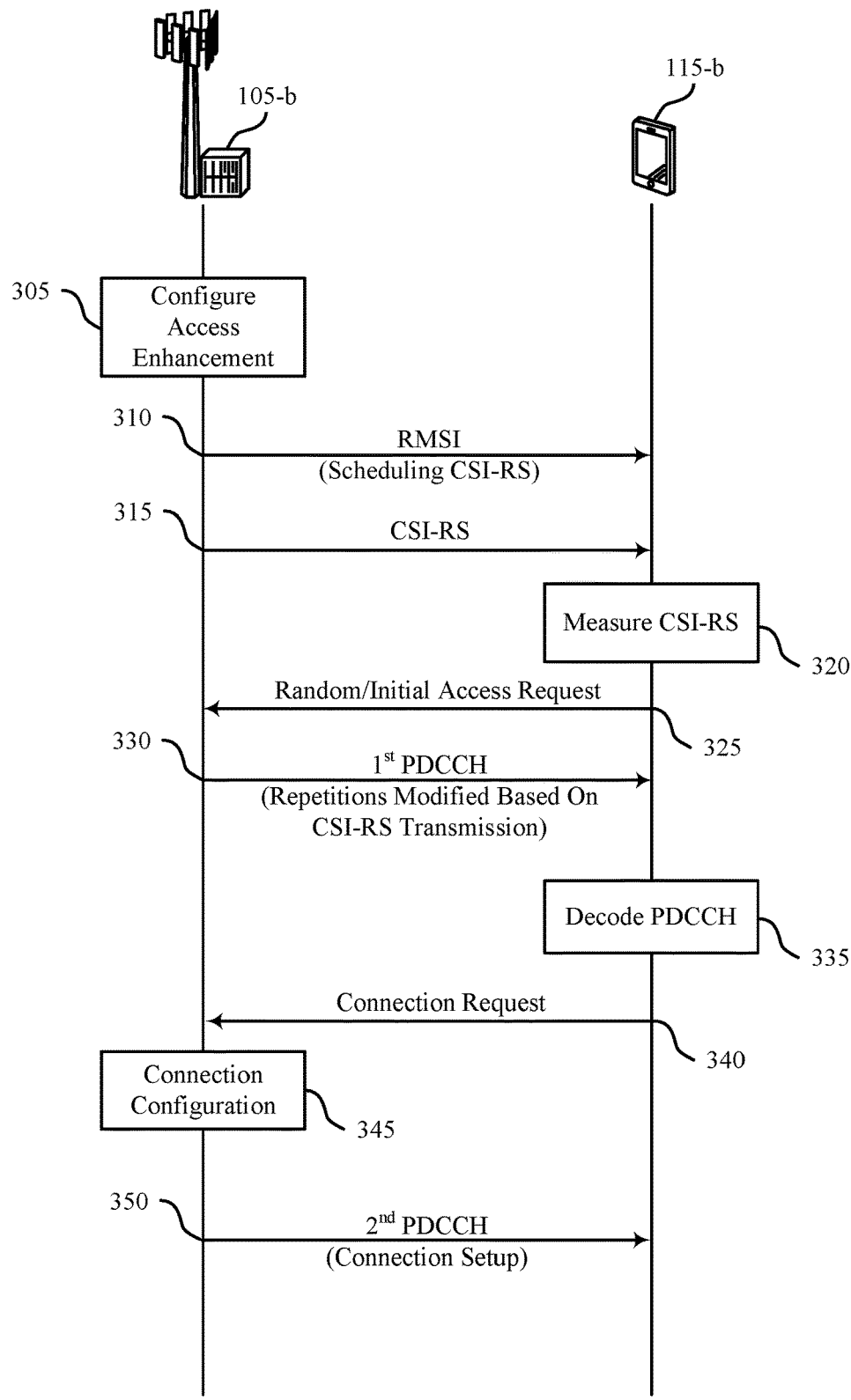
FIGS. 3 and 4 illustrate examples of process flows that support downlink transmission repetition techniques in wireless communications in accordance with aspects of the present disclosure.

FIG. 3 illustrates an example of a process flow 300 that supports downlink transmission repetition techniques in wireless communications in accordance with aspects of the present disclosure. In some examples, process flow 300 may implement aspects of wireless communications system 100 or 200. Process flow 300 may be implemented by a base station 105-b and a UE 115-b, which may be examples of base stations 105 and UEs 115 as described herein. Alternative examples of the following may be implemented, where some steps are performed in a different order than described or are not performed at all. In some cases, steps may include additional features not mentioned below, or further steps may be added.

In this example, at 305, the base station 105-b may configure one or more access enhancements. In some cases, the access enhancements may include one or more reference signals that are to be transmitted by the base station 105-b or the UE 115-b, that may be used for channel estimation and transmit/receive parameter adjustments. For example, access enhancements may include the scheduling of CSI-RS or SRS transmission before or during a random access procedure.

At 310, the base station 105-b may transmit a system information transmission, such as an RMSI transmission, to the UE 115-b (and one or more other UEs). In some cases, the RMSI may schedule a CSI-RS transmission, which may be used for channel estimation at the UE 115-b and for adjusting one or more receive parameters (e.g., beamforming parameters) to enhance the reception of subsequent transmissions from the base station 105-b. In some cases, the RMSI may include one or more parameters that indicate whether the UE 115-a is to implicitly modify a number of expected PDCCH repetitions based on the presence of absence of one or more access enhancements (e.g., a flag that indicates PDCCH repetitions are terminated based on a reference signal transmission within a predetermined or indicated time period of an instance PDCCH of the PDCCH transmission).

At 315, the base station 105-b may transmit the CSI-RS. At 320, the UE 115-b may measure the CSI-RS. In some cases, the UE 115-b may determine a channel estimate based on the CSI-RS, and update one or more receive parameters for subsequent downlink transmissions from the base station 105-b to enhance the likelihood of successful reception and decoding of the subsequent downlink transmissions.

At 325, the UE 115-b may transmit a random access request or initial access request to the base station 105-b (e.g., a RACH MSG-1 transmission). The random access request may be transmitted, for example, based on the UE 115-b determining that network access is needed for one or more communications with the network (e.g., based on a transmit buffer at the UE 115-b receiving data, based on a paging indication, etc.).

The base station 105-b may receive the random/initial access request, and at 330 may transmit a first PDCCH transmission to the UE 115-b (e.g., a random access response or RACH MSG-2). In some cases, the first PDCCH transmission to the UE 115-b may be transmitted using a number of repetitions that are modified based on the CSI-RS transmission. For example, a single instance of the first PDCCH transmission may be transmitted, or a reduced number of repetitions of the first PDCCH transmission may be transmitted.

At 335, the UE 115-b may decode the first PDCCH. In cases where a single instance of the first PDCCH is transmitted, the UE 115-b may decode the first PDCCH based on the single instance. In cases where multiple instances of the first PDCCH are transmitted (e.g., a reduced number of repetitions), the UE 115-b may place each instance of the first PDCCH in a soft buffer and perform decoding based on the soft buffer. Based on the first PDCCH, the UE 115-*b* may transmit a connection request at 340 (e.g., a RACH MSG-3 transmission). In some cases, the connection request may be transmitted in a single instance, or multiple repetitions of the connection request may be transmitted. At 345, the base station 105-*b* may configure a connection for communications with the UE 115-*b* (e.g., a connection configuration or reconfiguration). At 350, the base station 105-*b* may transmit a second PDCCH to the UE 115-*b*, that may provide connection setup information to the UE 115-*b*. In some cases, the second PDCCH may have a modified number of repetitions that correspond to the repetitions of the first PDCCH. In other cases, the second PDCCH may be transmitted with a different or originally expected number of repetitions (e.g., a number of repetitions expected in an absence of the one or more access enhancements).

Figure 4:
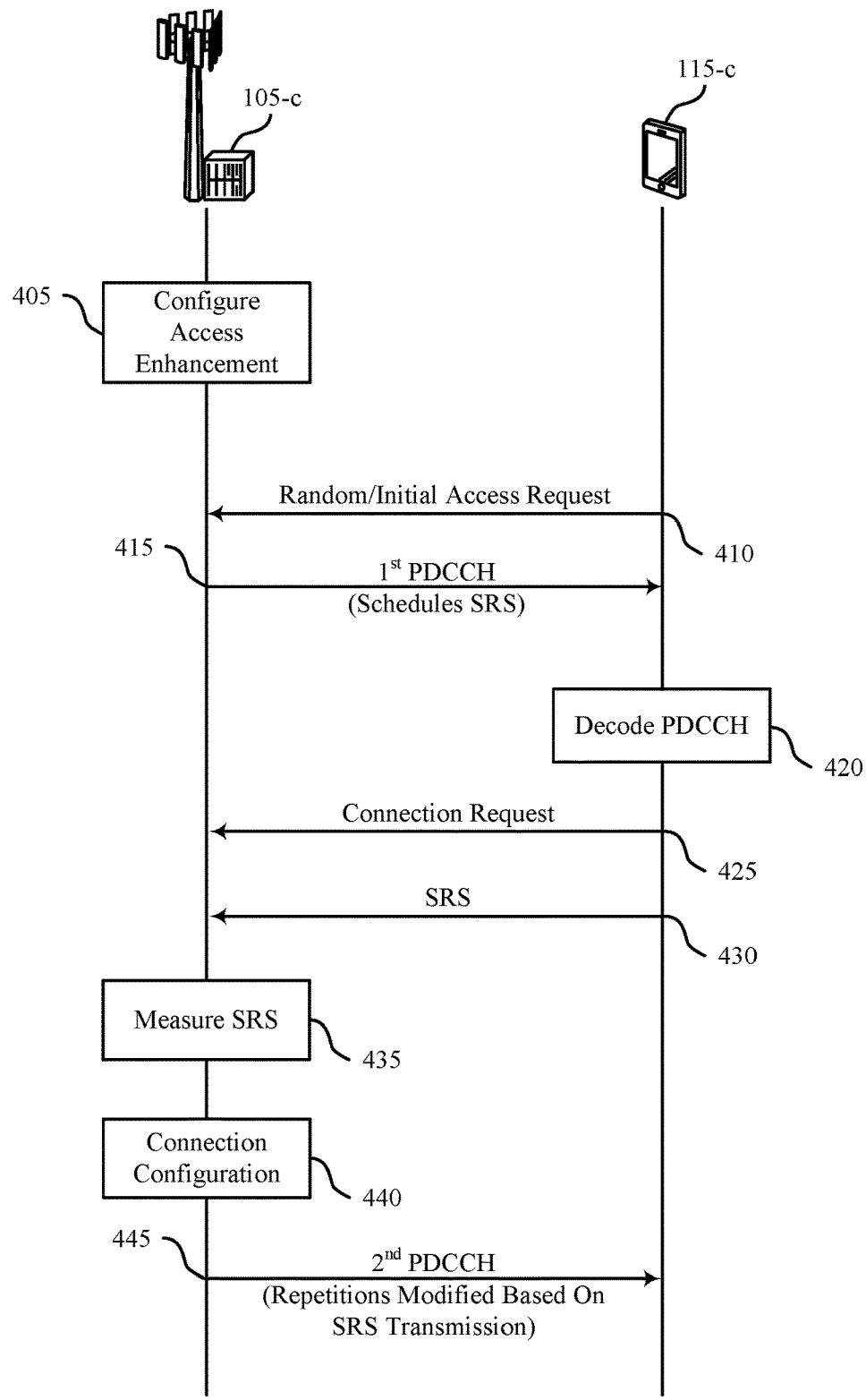

FIG. 4 illustrates an example of a process flow 400 that supports downlink transmission repetition techniques in wireless communications in accordance with aspects of the present disclosure. In some examples, process flow 400 may implement aspects of wireless communications system 100 or 200. Process flow 400 may be implemented by a base station 105-*c* and a UE 115-*c*, which may be examples of base stations 105 and UEs 115 as described herein. Alternative examples of the following may be implemented, where some steps are performed in a different order than described or are not performed at all. In some cases, steps may include additional features not mentioned below, or further steps may be added.

In this example, at 405, the base station 105-*c* may configure one or more access enhancements. In some cases, the access enhancements may include one or more reference signals that are to be transmitted by the base station 105-*c* or the UE 115-*c*, that may be used for channel estimation and transmit/receive parameter adjustments. For example, access enhancements may include the scheduling of CSI-RS or SRS transmission before or during a random access procedure.

At 410, the UE 115-*c* may transmit a random access request or initial access request to the base station 105-*c* (e.g., a RACH MSG-1 transmission). The random access request may be transmitted, for example, based on the UE 115-*c* determining that network access is needed for one or more communications with the network (e.g., based on a transmit buffer at the UE 115-*c* receiving data, based on a paging indication, etc.).

The base station 105-*c* may receive the random/initial access request, and at 415 may transmit a first PDCCH transmission to the UE 115-*c* (e.g., a random access response or RACH MSG-2). In some cases, the first PDCCH transmission to the UE 115-*c* may be transmitted using a number of repetitions that are based on a coverage enhancement level that is used for RACH access (e.g., that may be indicated in an RMSI transmission from the base station 105-*b*).

At 420, the UE 115-*c* may decode the first PDCCH. In some cases, the first PDCCH transmission may schedule a SRS that is to be transmitted by the UE 115-*b*. In some cases, the first PDCCH may provide an indication of one or more uplink resources for the SRS, and one or more uplink resources for a connection request message.

At 425, based on the first PDCCH, the UE 115-*c* may transmit a connection request (e.g., a RACH MSG-3 transmission) to the base station 105-*c*. In some cases, the connection request may be transmitted in a single instance, or multiple repetitions of the connection request may be transmitted.

At 430, the UE 115-*c* may transmit the SRS. At 435, the base station 105-*c* may measure the SRS. In some cases, the base station 105-*c* may determine a channel estimate based on the SRS, and update one or more transmit parameters for subsequent downlink transmissions from the base station 105-*c* to enhance the likelihood of successful reception and decoding of the subsequent downlink transmissions.

At 440, the base station 105-*c* may configure a connection for communications with the UE 115-*c* (e.g., a connection configuration or reconfiguration). At 445, the base station 105-*c* may transmit a second PDCCH to the UE 115-*c*, that may provide connection setup information to the UE 115-*c*. In some cases, the second PDCCH may have a modified number of repetitions that are based on the indication that was provided in the first PDCCH to transmit the SRS. The UE 115-*c* may monitor for a number of instances of the second PDCCH based on the modified number of repetitions that are transmitted.

Figure 5:
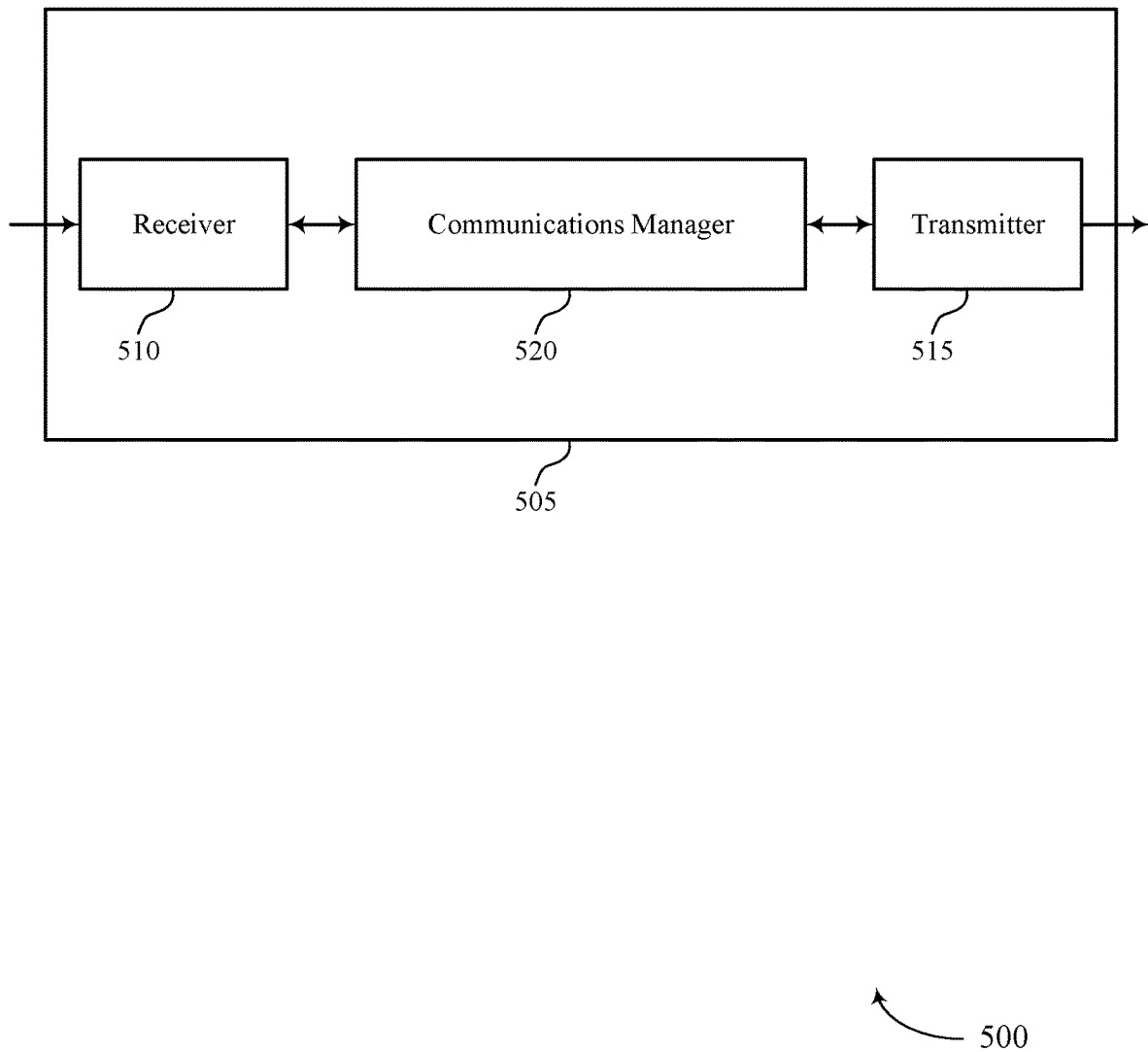
FIGS. 5 and 6 show block diagrams of devices that support downlink transmission repetition techniques in wireless communications in accordance with aspects of the present disclosure.

FIG. 5 shows a block diagram 500 of a device 505 that supports downlink transmission repetition techniques in wireless communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to downlink transmission repetition techniques in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to downlink transmission repetition techniques in wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of downlink transmission repetition techniques in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a user equipment in accordance with examples as disclosed herein. For example, the communications manager 520 may be configured as or otherwise support a means for receiving, from a base station prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The communications manager 520 may be configured as or otherwise support a means for monitoring, responsive to the first indication, a subset of the set of multiple downlink resources for a subset of the set of repetitions of the downlink communication.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increased reliability for downlink communications (e.g., PDCCH transmissions of a random access procedure), and also provide for power savings and reduced processing resource usage through termination of a downlink transmission (e.g., transmitting no or fewer repetitions of the downlink transmission subsequent to an initial instance of the downlink transmission) in the event that one or more communication enhancements associated with a random access or initial access procedure are present.

Figure 6:
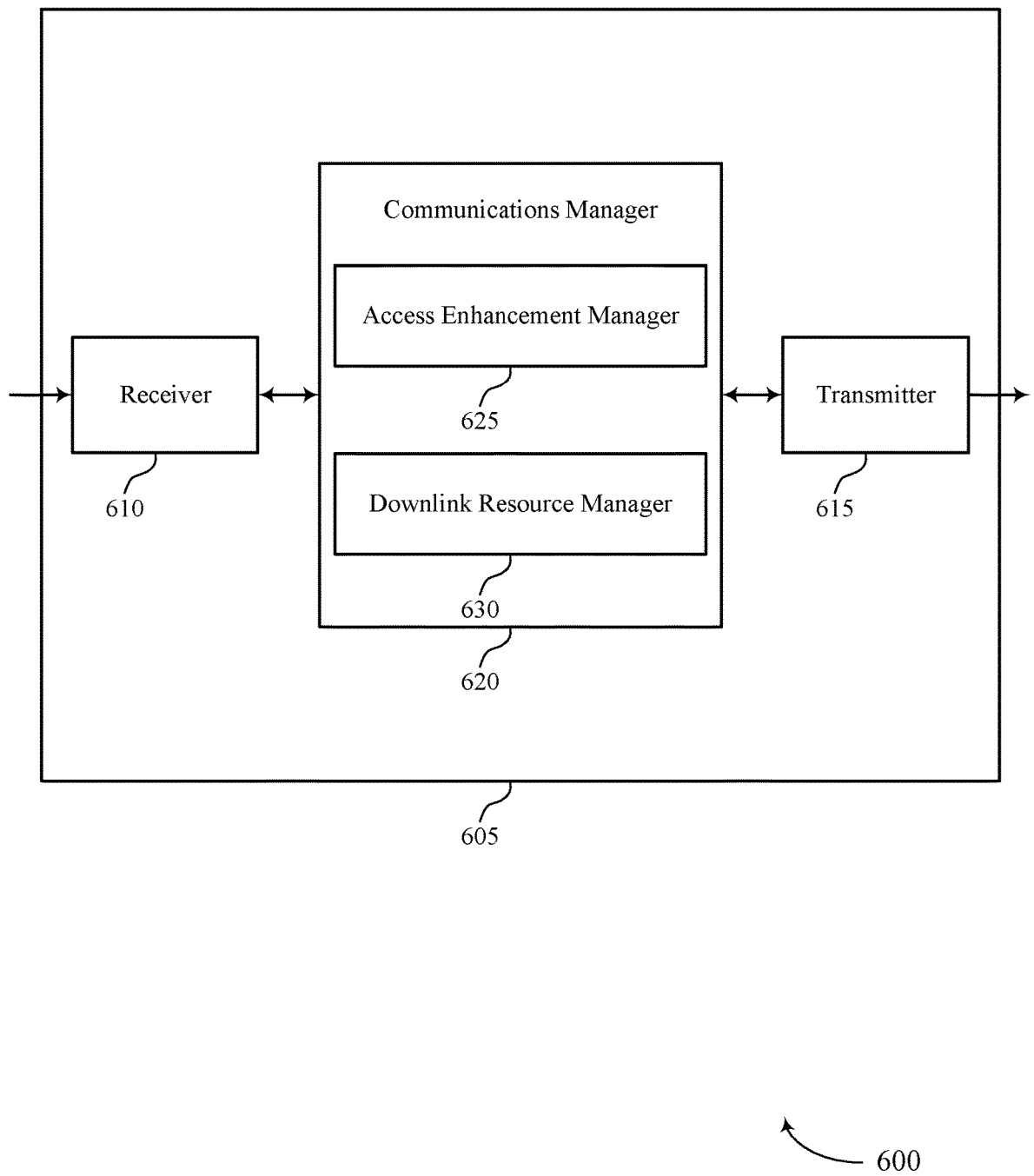

FIG. 6 shows a block diagram 600 of a device 605 that supports downlink transmission repetition techniques in wireless communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to downlink transmission repetition techniques in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to downlink transmission repetition techniques in wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of downlink transmission repetition techniques in wireless communications as described herein. For example, the communications manager 620 may include an access enhancement manager 625 a downlink resource manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a user equipment in accordance with examples as disclosed herein. The access enhancement manager 625 may be configured as or otherwise support a means for receiving, from a base station prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The downlink resource manager 630 may be configured as or otherwise support a means for monitoring, responsive to the first indication, a subset of the set of multiple downlink resources for a subset of the set of repetitions of the downlink communication.

Figure 7:
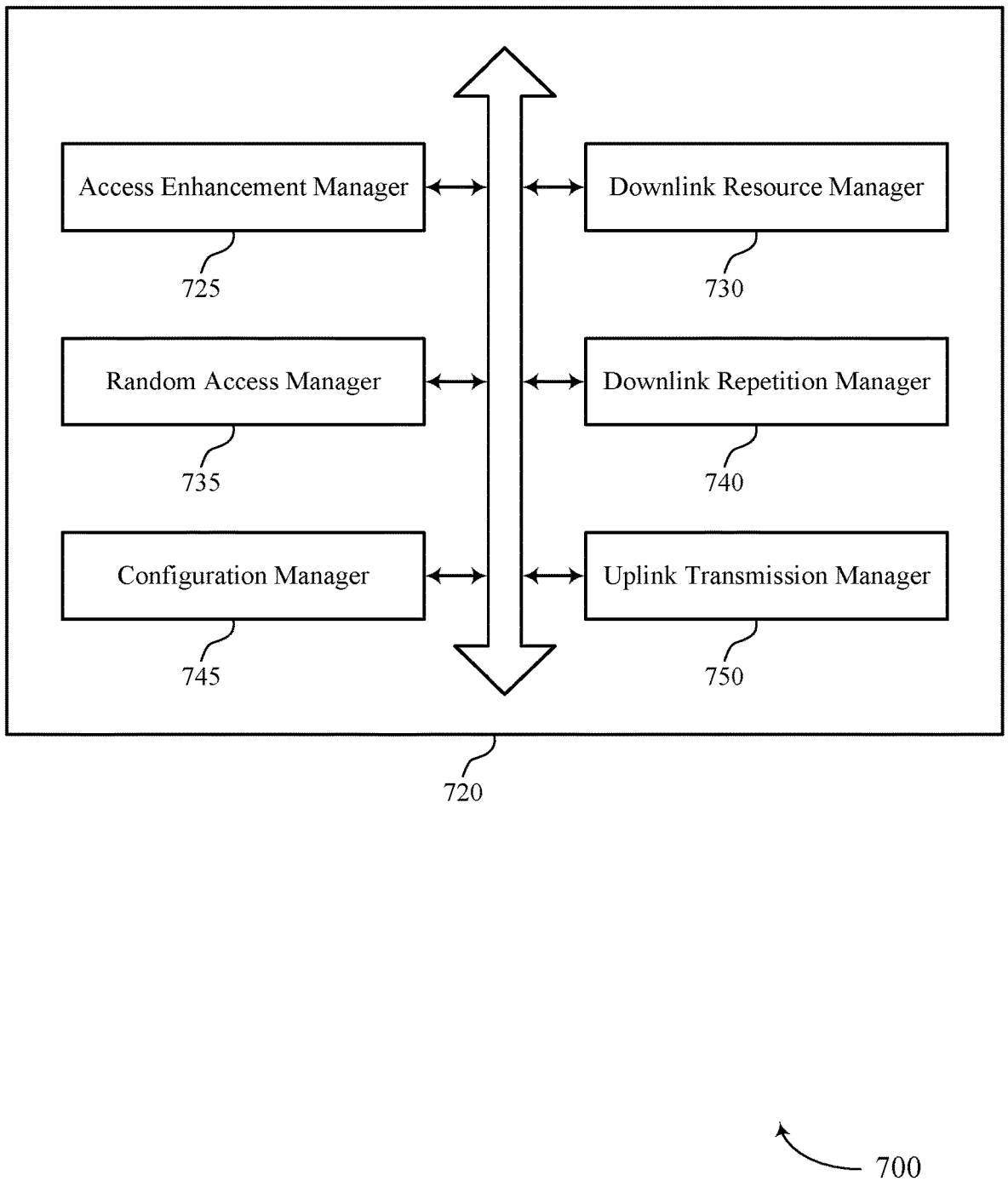
FIG. 7 shows a block diagram of a communications manager that supports downlink transmission repetition techniques in wireless communications in accordance with aspects of the present disclosure.

FIG. 7 shows a block diagram 700 of a communications manager 720 that supports downlink transmission repetition techniques in wireless communications in accordance with aspects of the present disclosure. The communications manager 720 may be an example of aspects of a communications manager 520, a communications manager 620, or both, as described herein. The communications manager 720, or various components thereof, may be an example of means for performing various aspects of downlink transmission repetition techniques in wireless communications as described herein. For example, the communications manager 720 may include an access enhancement manager 725, a downlink resource manager 730, a random access manager 735, a downlink repetition manager 740, a configuration manager 745, an uplink transmission manager 750, or any combination thereof. Each of these components may communicate, directly or indirectly, with one another (e.g., via one or more buses).

The communications manager 720 may support wireless communication at a user equipment in accordance with examples as disclosed herein. The access enhancement manager 725 may be configured as or otherwise support a means for receiving, from a base station prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The downlink resource manager 730 may be configured as or otherwise support a means for monitoring, responsive to the first indication, a subset of the set of multiple downlink resources for a subset of the set of repetitions of the downlink communication.

In some examples, to support receiving the first indication, the access enhancement manager 725 may be configured as or otherwise support a means for receiving scheduling information for a CSI-RS that is to be measured at the UE during or before the random access procedure.

In some examples, to support monitoring, the random access manager 735 may be configured as or otherwise support a means for monitoring for a random access response message on the subset of the set of multiple downlink resources based on the CSI-RS scheduling information, where the subset of the set of multiple downlink resources is associated with fewer instances of the downlink communication than the set of multiple downlink resources. In some examples, the random access response message is a message-2 transmission, and where a message-4 downlink control channel message is transmitted subsequent to the message-2 transmission using fewer repetitions than a total number of repetitions of the set of repetitions. In some examples, the first indication is a random access response from the base station that is transmitted responsive to a random access request of the UE, where the random access response schedules an SRS transmission from the UE. In some examples, the downlink communication is monitored on the subset of the set of multiple downlink resources based on the SRS transmission, and where the subset of the set of multiple downlink resources is associated with fewer instances of the downlink communication than the set of multiple downlink resources. In some examples, a number of repetitions of the downlink communication that are monitored at the UE is modified responsive to the first indication based on a set of predefined rules for the number of repetitions of the downlink communication.

In some examples, the configuration manager 745 may be configured as or otherwise support a means for receiving, from the base station, a system information communication that includes one or more parameters that identify a total number of repetitions of the set of repetitions that are to be monitored at the UE.

In some examples, the uplink transmission manager 750 may be configured as or otherwise support a means for transmitting a first communication to the base station, where a total number of repetitions of the set of repetitions is determined based on a first rule associated with the first communication, and where a second rule associated with the first indication provides an exception to the total number of repetitions of the set of repetitions that are to be monitored at the UE. In some examples, the first rule indicates that the UE is to monitor for repetitions of the downlink communication when the first communication is transmitted using multiple repetitions, and the second rule indicates that the UE is to discontinue monitoring for multiple instances of the downlink communication when an initial access enhancement or a random access enhancement is present.

In some examples, the initial access enhancement or the random access enhancement is based on one or more channel measurements that are enabled by the reference signal transmission. In some examples, a number of instances of the downlink communication that are to be transmitted is identified based on a parameter that is provided with system information that indicates the initial access enhancement or the random access enhancement. In some examples, the subset of the set of repetitions of the downlink communication includes fewer repetitions than the set of repetitions, or no repetitions of the downlink communication subsequent to an initial transmission of the downlink communication.

Figure 8:
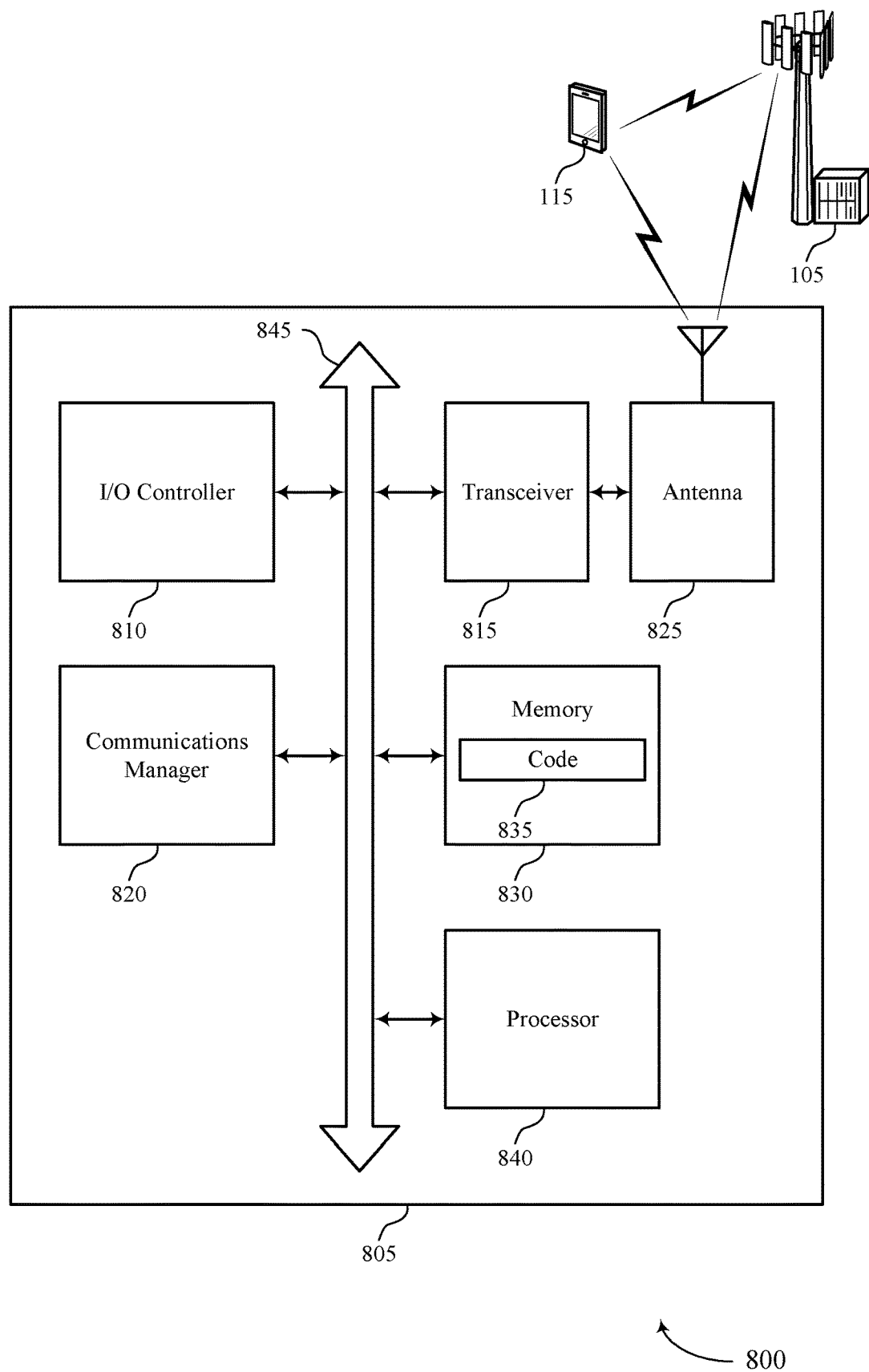
FIG. 8 shows a diagram of a system including a device that supports downlink transmission repetition techniques in wireless communications in accordance with aspects of the present disclosure.

FIG. 8 shows a diagram of a system 800 including a device 805 that supports downlink transmission repetition techniques in wireless communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting downlink transmission repetition techniques in wireless communications). For example, the device 805 or a component of the device 805 may include a processor 840 and memory 830 coupled to the processor 840, the processor 840 and memory 830 configured to perform various functions described herein.

The communications manager 820 may support wireless communication at a user equipment in accordance with examples as disclosed herein. For example, the communications manager 820 may be configured as or otherwise support a means for receiving, from a base station prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The communications manager 820 may be configured as or otherwise support a means for monitoring, responsive to the first indication, a subset of the set of multiple downlink resources for a subset of the set of repetitions of the downlink communication.

By including or configuring the communications manager 820 in accordance with examples as described herein, the device 805 may support techniques for increased reliability for downlink communications (e.g., PDCCH transmissions of a random access procedure), and also provide for reduced wireless resource usage associated with multiple repetitions of a communication. Further, such techniques may provide power savings and reduced resource usage through termination of a downlink transmission (e.g., transmitting no or fewer repetitions of the downlink transmission subsequent to an initial instance of the downlink transmission) in the event that one or more communication enhancements associated with a random access or initial access procedure are present. Such techniques may also provide for increased network capacity and throughput through efficient usage of wireless resources, thus providing an enhanced user experience, longer battery life, improved utilization of processing capability, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of downlink transmission repetition techniques in wireless communications as described herein, or the processor 840 and the memory 830 may be otherwise configured to perform or support such operations.

Figure 9:
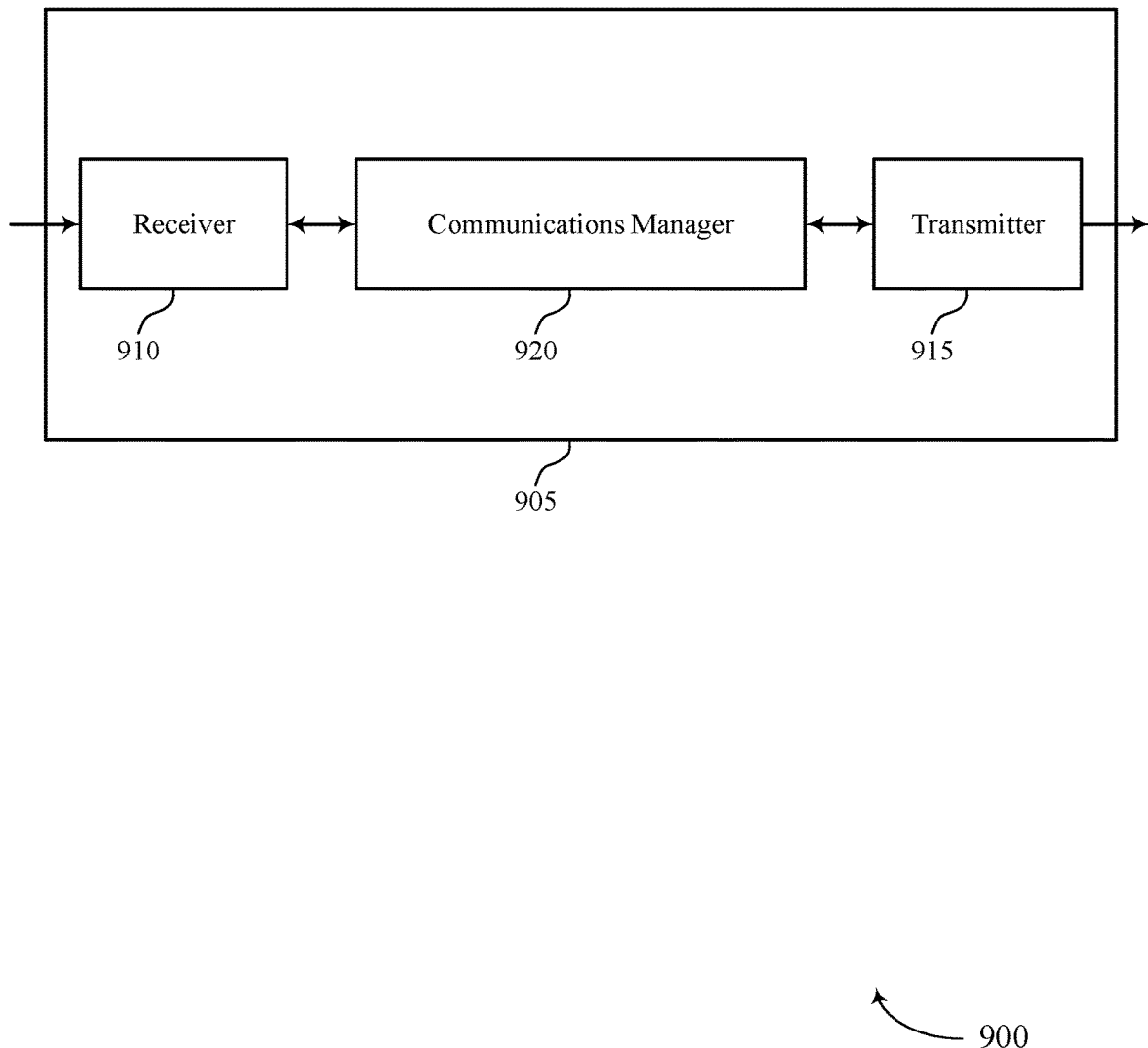
FIGS. 9 and 10 show block diagrams of devices that support downlink transmission repetition techniques in wireless communications in accordance with aspects of the present disclosure.

FIG. 9 shows a block diagram 900 of a device 905 that supports downlink transmission repetition techniques in wireless communications in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to downlink transmission repetition techniques in wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to downlink transmission repetition techniques in wireless communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of downlink transmission repetition techniques in wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means transmitting, to a user equipment (UE) prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The communications manager 920 may be configured as or otherwise support a means for transmitting, responsive to the first indication, a subset of the set of repetitions of the downlink communication using a subset of the set of multiple downlink resources.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for increased reliability for downlink communications (e.g., PDCCH transmissions of a random access procedure), and also provide for power savings and reduced processing resource usage through termination of a downlink transmission (e.g., transmitting no or fewer repetitions of the downlink transmission subsequent to an initial instance of the downlink transmission) in the event that one or more communication enhancements associated with a random access or initial access procedure are present.

Figure 10:
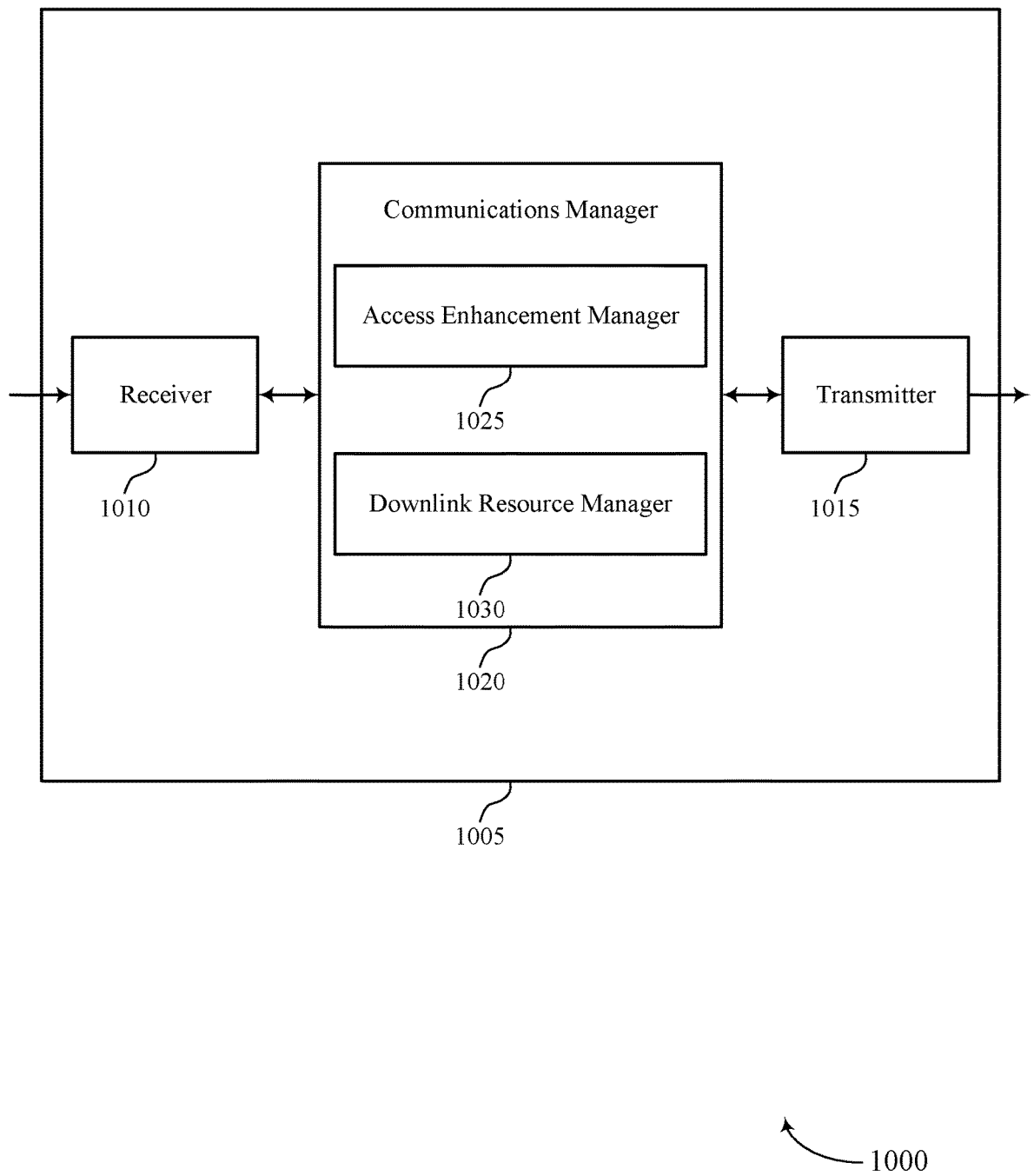

FIG. 10 shows a block diagram 1000 of a device 1005 that supports downlink transmission repetition techniques in wireless communications in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to downlink transmission repetition techniques in wireless communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to downlink transmission repetition techniques in wireless communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of downlink transmission repetition techniques in wireless communications as described herein. For example, the communications manager 1020 may include an access enhancement manager 1025 a downlink resource manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The access enhancement manager 1025 may be configured as or otherwise support a means for transmitting, to a user equipment (UE) prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The downlink resource manager 1030 may be configured as or otherwise support a means for transmitting, responsive to the first indication, a subset of the set of repetitions of the downlink communication using a subset of the set of multiple downlink resources.

Figure 11:
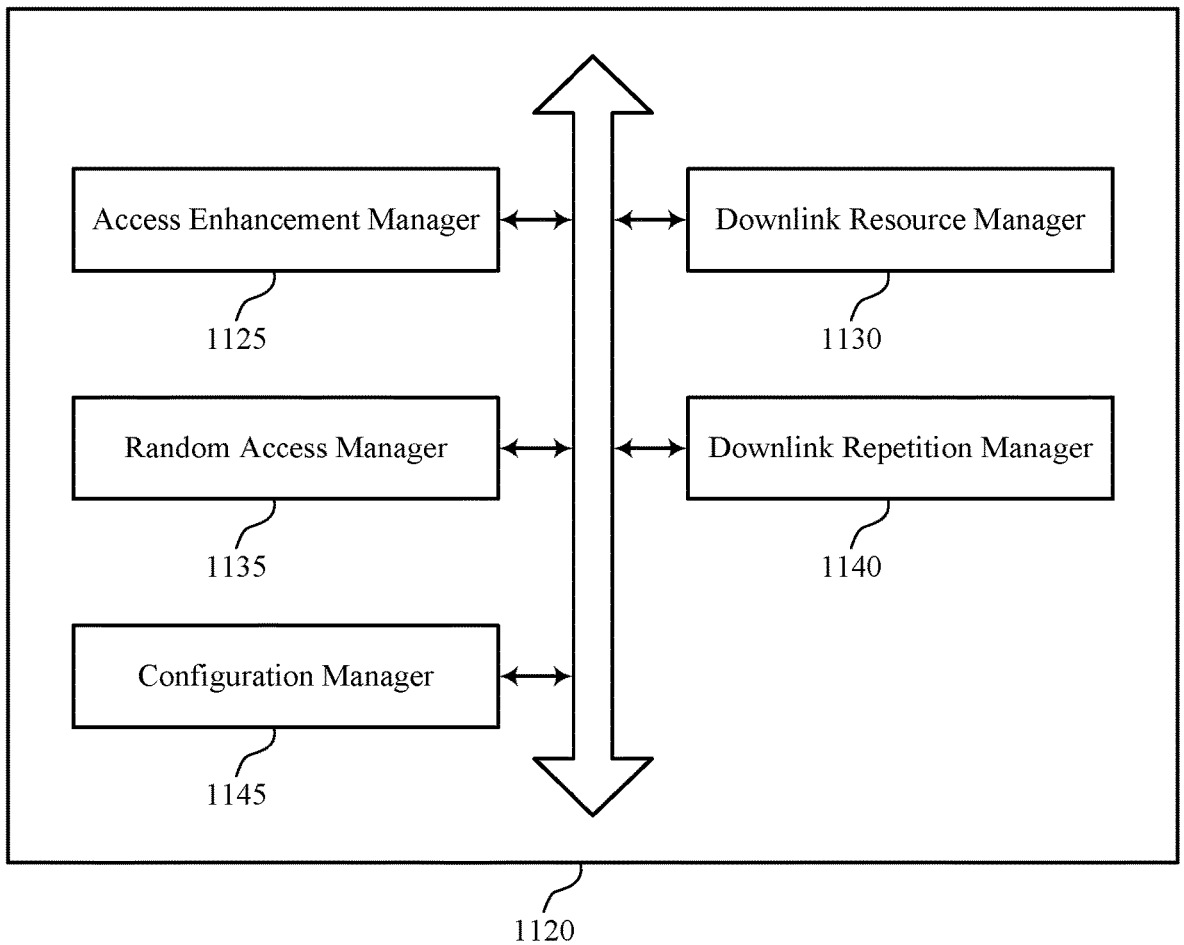
FIG. 11 shows a block diagram of a communications manager that supports downlink transmission repetition techniques in wireless communications in accordance with aspects of the present disclosure.

FIG. 11 shows a block diagram 1100 of a communications manager 1120 that supports downlink transmission repetition techniques in wireless communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of downlink transmission repetition techniques in wireless communications as described herein. For example, the communications manager 1120 may include an access enhancement manager 1125, a downlink resource manager 1130, a random access manager 1135, a downlink repetition manager 1140, a configuration manager 1145, or any combination thereof. Each of these components may communicate, directly or indirectly, with one another (e.g., via one or more buses).

The communications manager 1120 may support wireless communication at a base station in accordance with examples as disclosed herein. The access enhancement manager 1125 may be configured as or otherwise support a means for transmitting, to a user equipment (UE) prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The downlink resource manager 1130 may be configured as or otherwise support a means for transmitting, responsive to the first indication, a subset of the set of repetitions of the downlink communication using a subset of the set of multiple downlink resources.

In some examples, to support transmitting the first indication, the access enhancement manager 1125 may be configured as or otherwise support a means for transmitting scheduling information for a channel state information reference signal (CSI-RS) that is to be measured at the UE during or before the random access procedure.

In some examples, to support transmitting the subset of the set of repetitions, the random access manager 1135 may be configured as or otherwise support a means for transmitting a random access response message using the subset of the set of multiple downlink resources based on the CSI-RS scheduling information, where the subset of the set of multiple downlink resources is associated with fewer instances of the downlink communication than the set of multiple downlink resources. In some examples, the random access response message is a message-2 transmission, and where a message-4 downlink control channel message is transmitted subsequent to the message-2 transmission using fewer repetitions than a total number of repetitions of the set of repetitions.

In some examples, the first indication is a random access response from the base station that is transmitted responsive to a random access request of the UE, where the random access response schedules an SRS transmission from the UE. In some examples, the downlink communication is transmitted on the subset of the set of multiple downlink resources based on the SRS transmission, and where the subset of the set of multiple downlink resources is associated with fewer instances of the downlink communication than the set of multiple downlink resources. In some examples, a number of repetitions of the downlink communication that are transmitted to the UE is modified responsive to the first indication based on a set of predefined rules for the number of repetitions of the downlink communication.

In some examples, the configuration manager 1145 may be configured as or otherwise support a means for transmitting a system information communication that includes one or more parameters that identify a total number of repetitions of the set of repetitions that are to be monitored at the UE.

In some examples, the downlink repetition manager 1140 may be configured as or otherwise support a means for receiving, from the UE, a first communication, where a total number of repetitions of the set of repetitions is determined based on a first rule associated with the first communication, and where a second rule associated with the first indication provides an exception to the total number of repetitions of the set of repetitions that are to be transmitted to the UE. In some examples, the first rule indicates that the UE is to monitor for repetitions of the downlink communication when the first communication is transmitted using multiple repetitions, and the second rule indicates that the UE is to discontinue monitoring for multiple instances of the downlink communication when an initial access enhancement or a random access enhancement is present. In some examples, the initial access enhancement or the random access enhancement is based on one or more channel measurements that are enabled by the reference signal transmission. In some examples, a number of instances of the downlink communication that are to be transmitted is identified based on a parameter that is provided with system information that indicates the initial access enhancement or the random access enhancement. In some examples, the subset of the set of repetitions of the downlink communication includes fewer repetitions than the set of repetitions, or no repetitions of the downlink communication subsequent to an initial transmission of the downlink communication.

Figure 12:
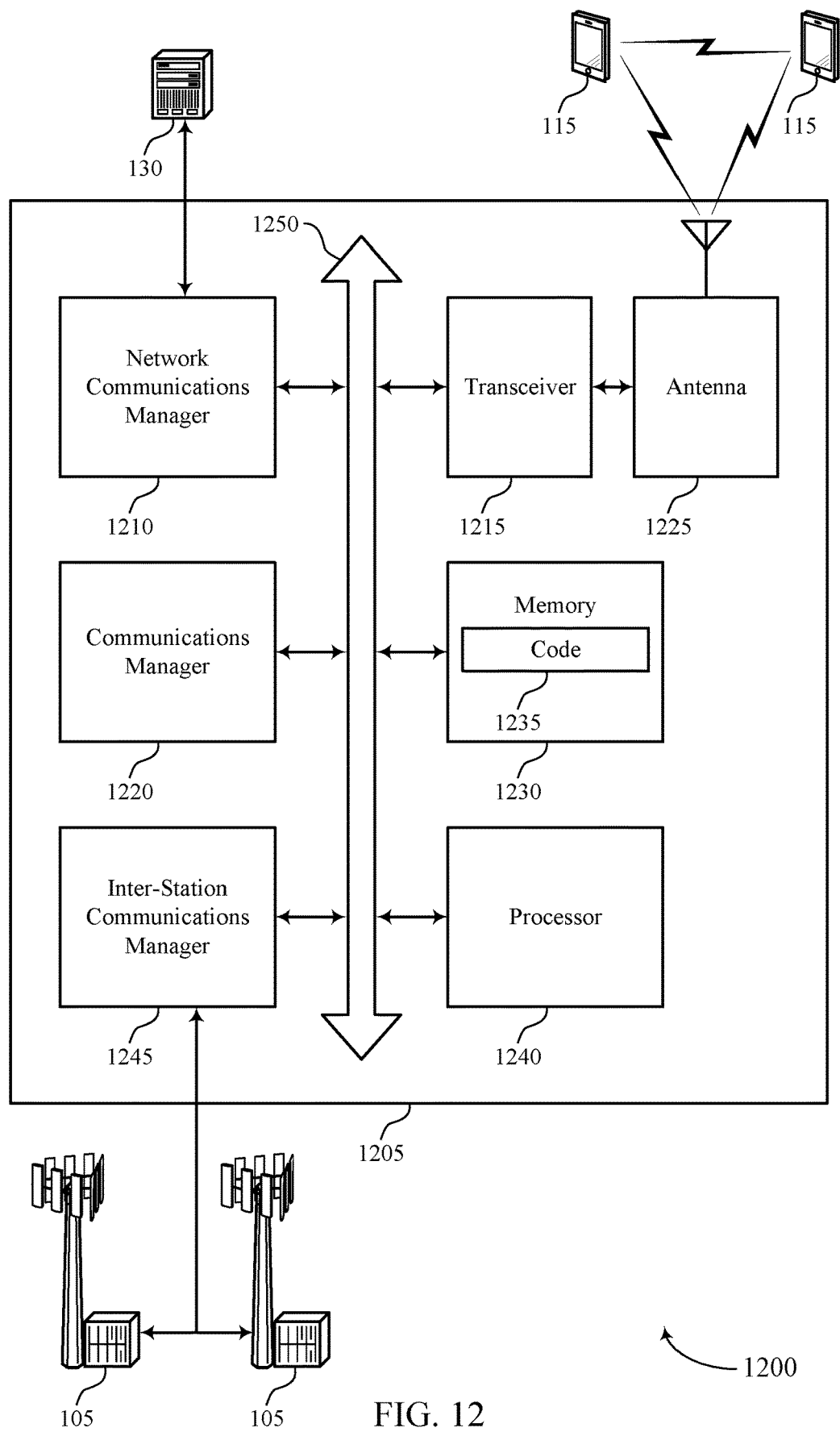
FIG. 12 shows a diagram of a system including a device that supports downlink transmission repetition techniques in wireless communications in accordance with aspects of the present disclosure.

FIG. 12 shows a diagram of a system 1200 including a device 1205 that supports downlink transmission repetition techniques in wireless communications in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225.

The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting downlink transmission repetition techniques in wireless communications). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a user equipment (UE) prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The communications manager 1220 may be configured as or otherwise support a means for transmitting, responsive to the first indication, a subset of the set of repetitions of the downlink communication using a subset of the set of multiple downlink resources.

By including or configuring the communications manager 1220 in accordance with examples as described herein, the device 1205 may support techniques for increased reliability for downlink communications (e.g., PDCCH transmissions of a random access procedure), and also provide for reduced wireless resource usage associated with multiple repetitions of a communication. Further, such techniques may provide power savings and reduced resource usage through termination of a downlink transmission (e.g., transmitting no or fewer repetitions of the downlink transmission subsequent to an initial instance of the downlink transmission) in the event that one or more communication enhancements associated with a random access or initial access procedure are present. Such techniques may also provide for increased network capacity and throughput through efficient usage of wireless resources, thus providing an enhanced user experience, longer battery life, improved utilization of processing capability, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of downlink transmission repetition techniques in wireless communications as described herein, or the processor 1240 and the memory 1230 may be otherwise configured to perform or support such operations.

Figure 13:
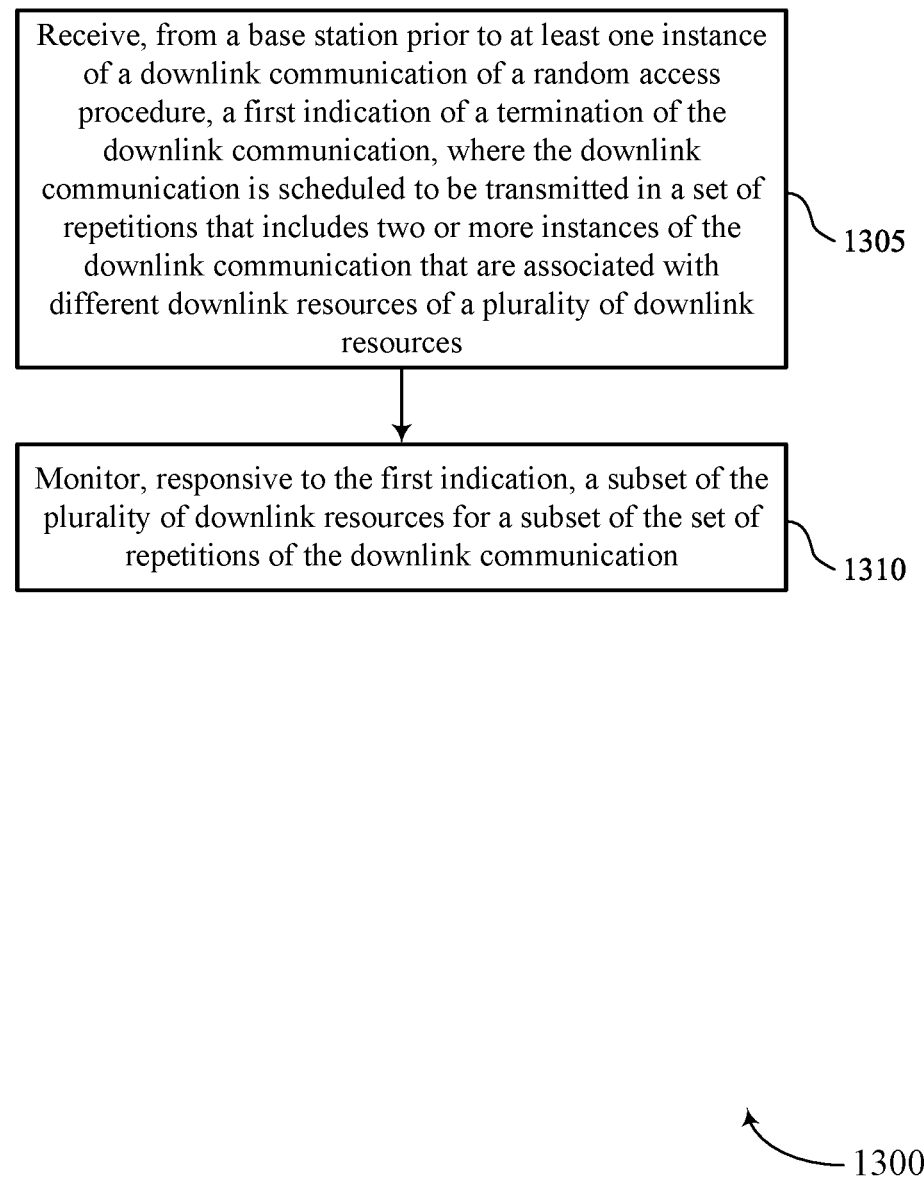
FIGS. 13 through 20 show flowcharts illustrating methods that support downlink transmission repetition techniques in wireless communications in accordance with aspects of the present disclosure.

FIG. 13 shows a flowchart illustrating a method 1300 that supports downlink transmission repetition techniques in wireless communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The operations of 1305 may be performed in accordance with examples as disclosed herein. In some examples, aspects of the operations of 1305 may be performed by an access enhancement manager 725 as described with reference to FIG. 7.

At 1310, the method may include monitoring, responsive to the first indication, a subset of the set of multiple downlink resources for a subset of the set of repetitions of the downlink communication. The operations of 1310 may be performed in accordance with examples as disclosed herein. In some examples, aspects of the operations of 1310 may be performed by a downlink resource manager 730 as described with reference to FIG. 7.

Figure 14:
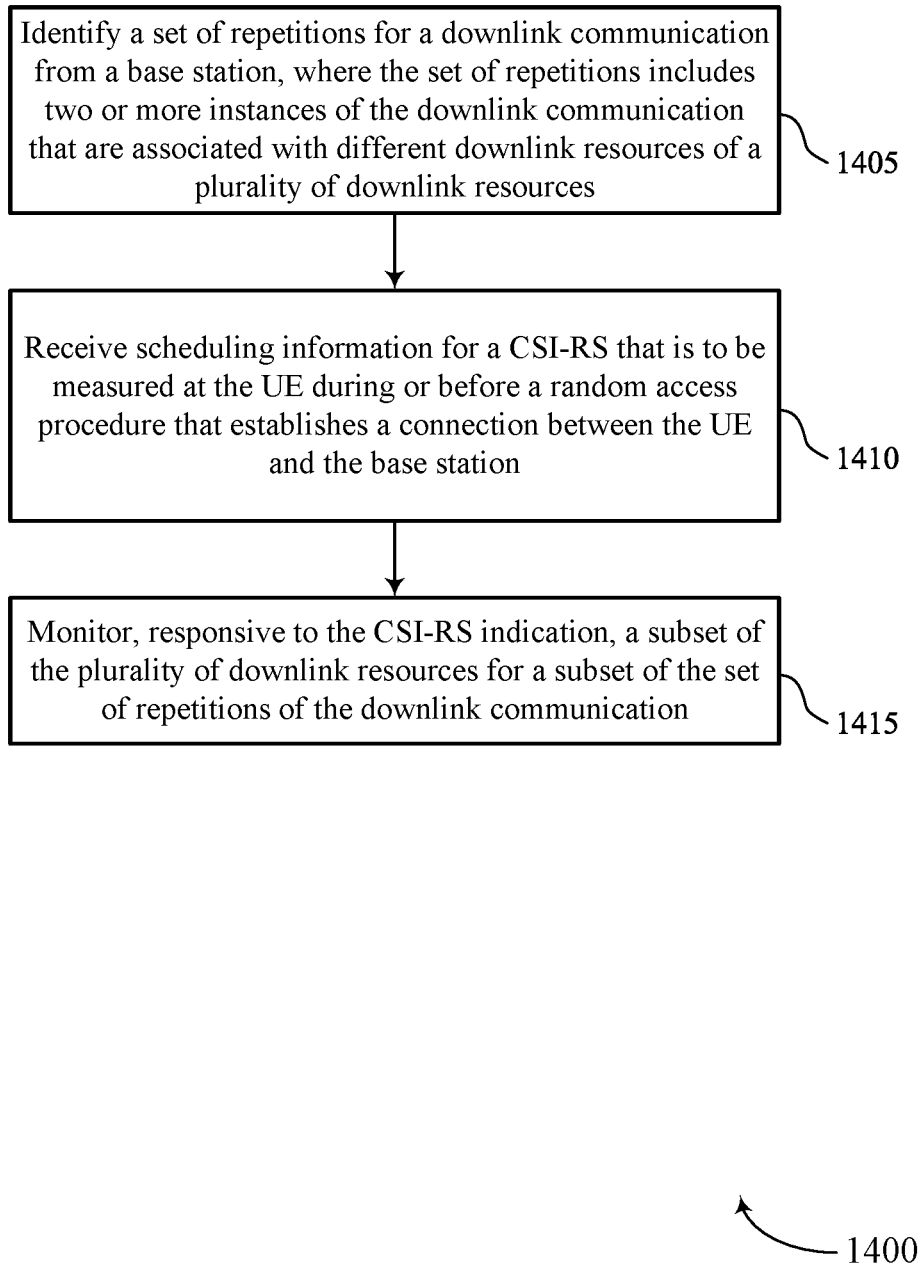

FIG. 14 shows a flowchart illustrating a method 1400 that supports downlink transmission repetition techniques in wireless communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include identifying a set of repetitions for a downlink communication from a base station, where the set of repetitions includes two or more instances of the downlink communication that are associated with different downlink resources of a plurality of downlink resources. The operations of 1405 may be performed in accordance with examples as disclosed herein. In some examples, aspects of the operations of 1405 may be performed by an access enhancement manager 725 as described with reference to FIG. 7.

At 1410, the method may include receiving scheduling information for a CSI-RS that is to be measured at the UE during or before a random access procedure that establishes a connection between the UE and the base station. The operations of 1410 may be performed in accordance with examples as disclosed herein. In some examples, aspects of the operations of 1410 may be performed by an access enhancement manager 725 as described with reference to FIG. 7.

At 1415, the method may include monitoring, responsive to the CSI-RS indication, a subset of the set of multiple downlink resources for a subset of the set of repetitions of the downlink communication. The operations of 1415 may be performed in accordance with examples as disclosed herein. In some examples, aspects of the operations of 1415 may be performed by a downlink resource manager 730 as described with reference to FIG. 7.

Figure 15:
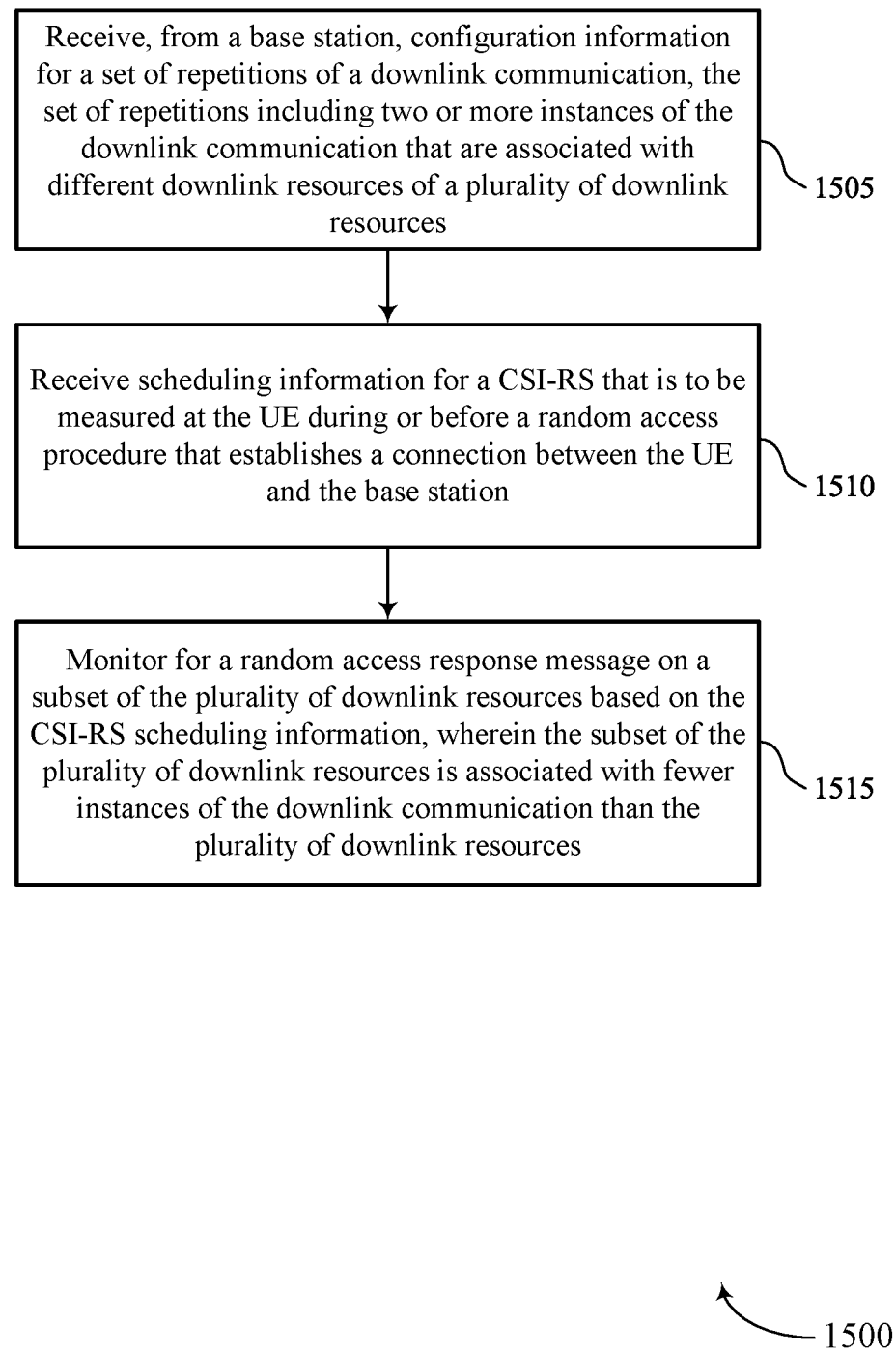

FIG. 15 shows a flowchart illustrating a method 1500 that supports downlink transmission repetition techniques in wireless communications in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, configuration information for a set of repetitions of a downlink communication, the set of repetitions including two or more instances of the downlink communication that are associated with different downlink resources of a plurality of downlink resources. The operations of 1505 may be performed in accordance with examples as disclosed herein. In some examples, aspects of the operations of 1505 may be performed by an access enhancement manager 725 as described with reference to FIG. 7.

At 1510, the method may include receiving scheduling information for a CSI-RS that is to be measured at the UE during or before a random access procedure that establishes a connection between the UE and the base station. The operations of 1510 may be performed in accordance with examples as disclosed herein. In some examples, aspects of the operations of 1510 may be performed by an access enhancement manager 725 as described with reference to FIG. 7.

At 1515, the method may include monitoring for a random access response message on a subset of the set of multiple downlink resources based on the CSI-RS scheduling information, where the subset of the set of multiple downlink resources is associated with fewer instances of the downlink communication than the set of multiple downlink resources. The operations of 1515 may be performed in accordance with examples as disclosed herein. In some examples, aspects of the operations of 1515 may be performed by a random access manager 735 as described with reference to FIG. 7.

Figure 16:
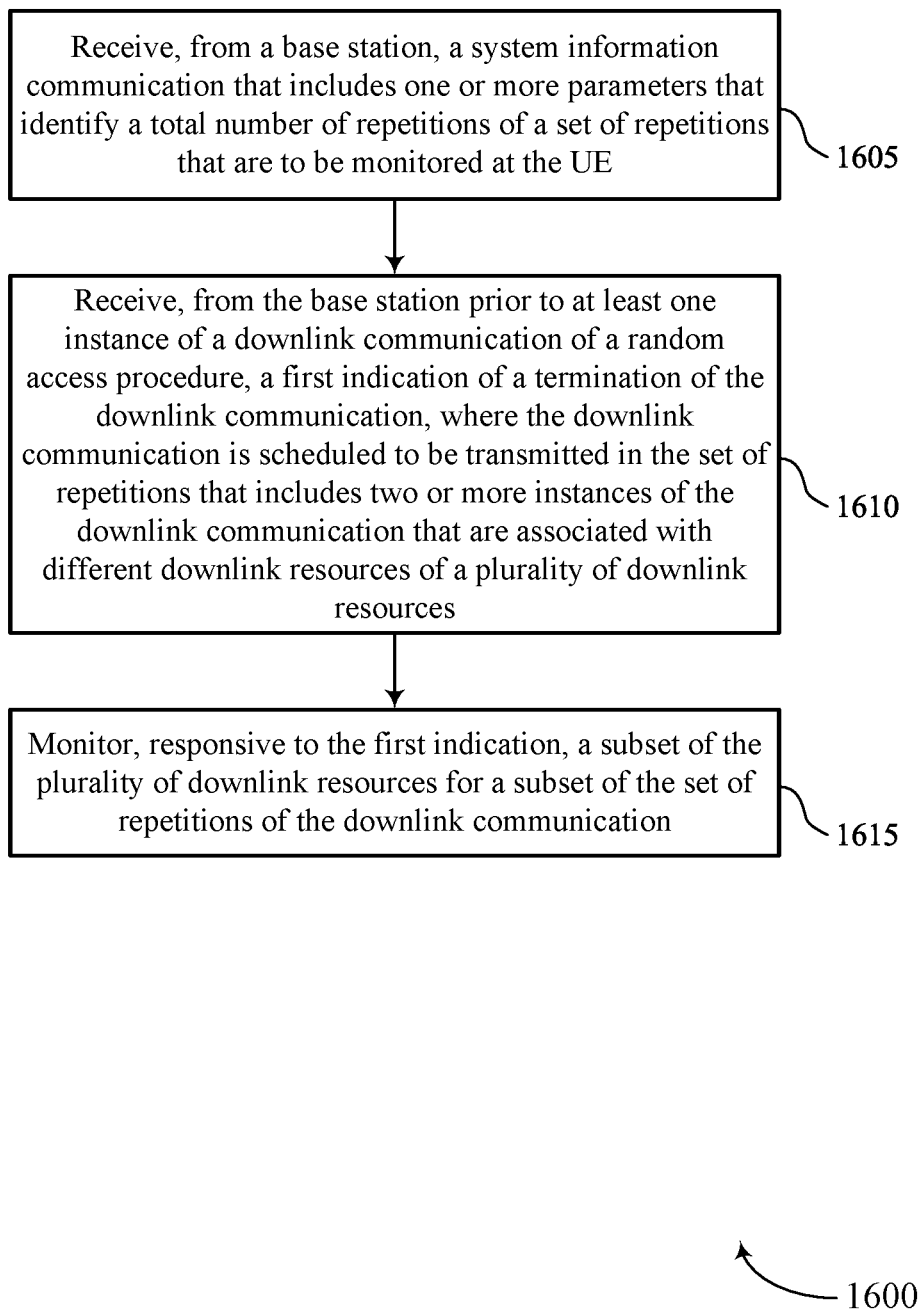

FIG. 16 shows a flowchart illustrating a method 1600 that supports downlink transmission repetition techniques in wireless communications in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a system information communication that includes one or more parameters that identify a total number of repetitions of a set of repetitions that are to be monitored at the UE. The operations of 1605 may be performed in accordance with examples as disclosed herein. In some examples, aspects of the operations of 1605 may be performed by a configuration manager 745 as described with reference to FIG. 7.

At 1610, the method may include receiving, from the base station prior to at least one instance of a downlink communication of a random access procedure, a first indication of a termination of the downlink communication, where the downlink communication is scheduled to be transmitted in the set of repetitions that includes two or more instances of the downlink communication that are associated with different downlink resources of a plurality of downlink resources. The operations of 1610 may be performed in accordance with examples as disclosed herein. In some examples, aspects of the operations of 1610 may be performed by an access enhancement manager 725 as described with reference to FIG. 7.

At 1615, the method may include monitoring, responsive to the first indication, a subset of the set of multiple downlink resources for a subset of the set of repetitions of the downlink communication. The operations of 1615 may be performed in accordance with examples as disclosed herein. In some examples, aspects of the operations of 1615 may be performed by a downlink resource manager 730 as described with reference to FIG. 7.

Figure 17:
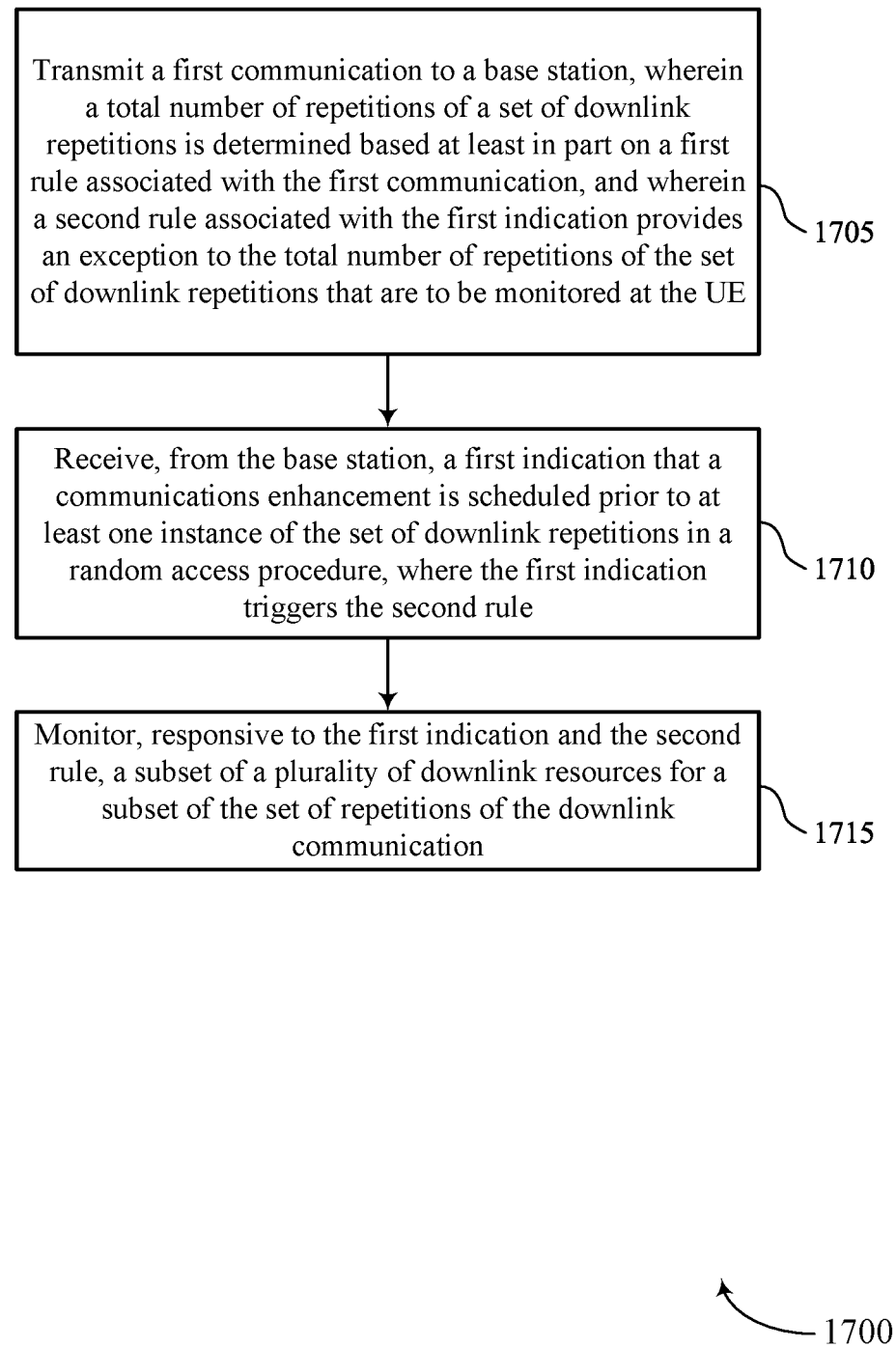

FIG. 17 shows a flowchart illustrating a method 1700 that supports downlink transmission repetition techniques in wireless communications in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include transmitting a first communication to a base station, where a total number of repetitions of a set of downlink repetitions is determined based on a first rule associated with the first communication, and where a second rule associated with the first indication provides an exception to the total number of repetitions of the set of downlink repetitions that are to be monitored at the UE. The operations of 1705 may be performed in accordance with examples as disclosed herein. In some examples, aspects of the operations of 1705 may be performed by an uplink transmission manager 750 as described with reference to FIG. 7.

At 1710, the method may include receiving, from a base station, a first indication that a communications enhancement is scheduled prior to at least one instance of the set of downlink repetitions in a random access procedure, where the first indication triggers the second rule. The operations of 1710 may be performed in accordance with examples as disclosed herein. In some examples, aspects of the operations of 1710 may be performed by an access enhancement manager 725 as described with reference to FIG. 7.

At 1715, the method may include monitoring, responsive to the first indication and the second rule, a subset of the set of multiple downlink resources for a subset of the set of repetitions of the downlink communication. The operations of 1715 may be performed in accordance with examples as disclosed herein. In some examples, aspects of the operations of 1715 may be performed by a downlink resource manager 730 as described with reference to FIG. 7.

Figure 18:
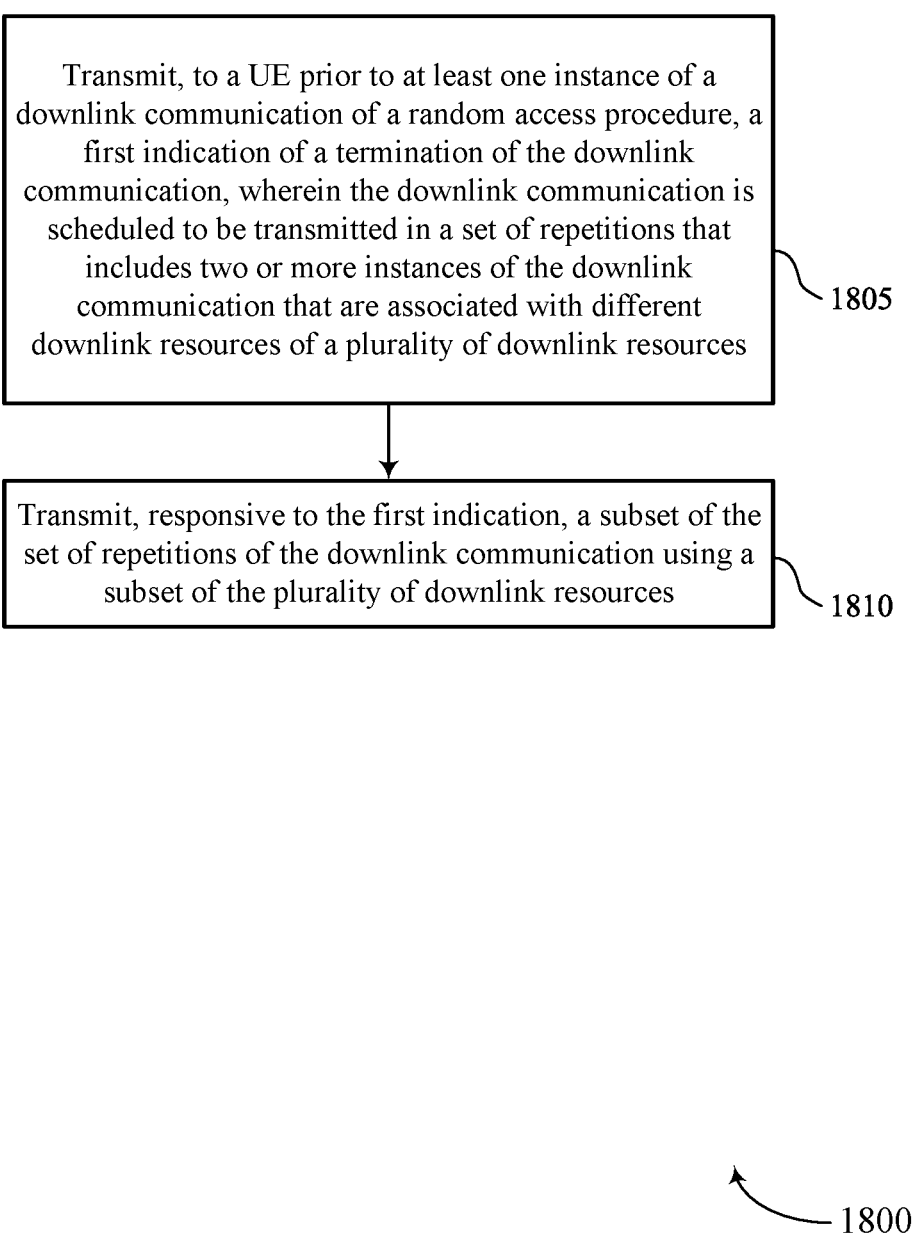

FIG. 18 shows a flowchart illustrating a method 1800 that supports downlink transmission repetition techniques in wireless communications in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE prior to at least one instance of a downlink communication of a random access procedure, a first indication of a termination of the downlink communication, wherein the downlink communication is scheduled to be transmitted in a set of repetitions that includes two or more instances of the downlink communication that are associated with different downlink resources of a plurality of downlink resources. The operations of 1805 may be performed in accordance with examples as disclosed herein. In some examples, aspects of the operations of 1805 may be performed by an access enhancement manager 1125 as described with reference to FIG. 11.

At 1810, the method may include transmitting, responsive to the first indication, a subset of the set of repetitions of the downlink communication using a subset of the set of multiple downlink resources. The operations of 1810 may be performed in accordance with examples as disclosed herein. In some examples, aspects of the operations of 1810 may be performed by a downlink resource manager 1130 as described with reference to FIG. 11.

Figure 19:
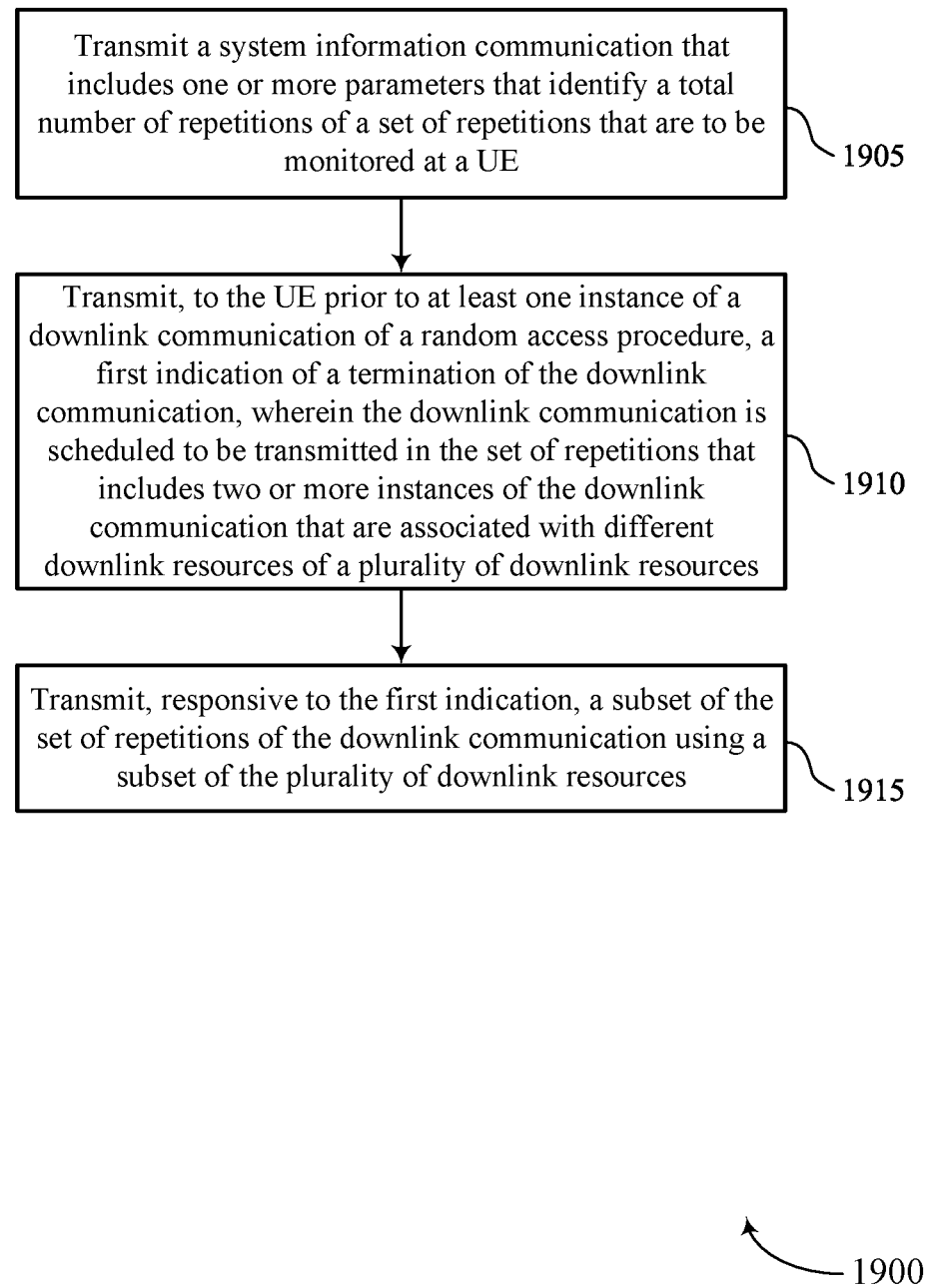

FIG. 19 shows a flowchart illustrating a method 1900 that supports downlink transmission repetition techniques in wireless communications in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include transmitting a system information communication that includes one or more parameters that identify a total number of repetitions of a set of repetitions that are to be monitored at a UE. The operations of 1905 may be performed in accordance with examples as disclosed herein. In some examples, aspects of the operations of 1905 may be performed by a configuration manager 1145 as described with reference to FIG. 11.

At 1910, the method may include transmitting, to the UE prior to at least one instance of a downlink communication of a random access procedure, a first indication of a termination of the downlink communication, wherein the downlink communication is scheduled to be transmitted in the set of repetitions that includes two or more instances of the downlink communication that are associated with different downlink resources of a plurality of downlink resources. The operations of 1910 may be performed in accordance with examples as disclosed herein. In some examples, aspects of the operations of 1910 may be performed by an access enhancement manager 1125 as described with reference to FIG. 11.

At 1915, the method may include transmitting, responsive to the first indication, a subset of the set of repetitions of the downlink communication using a subset of the set of multiple downlink resources. The operations of 1915 may be performed in accordance with examples as disclosed herein. In some examples, aspects of the operations of 1915 may be performed by a downlink resource manager 1130 as described with reference to FIG. 11.

Figure 20:
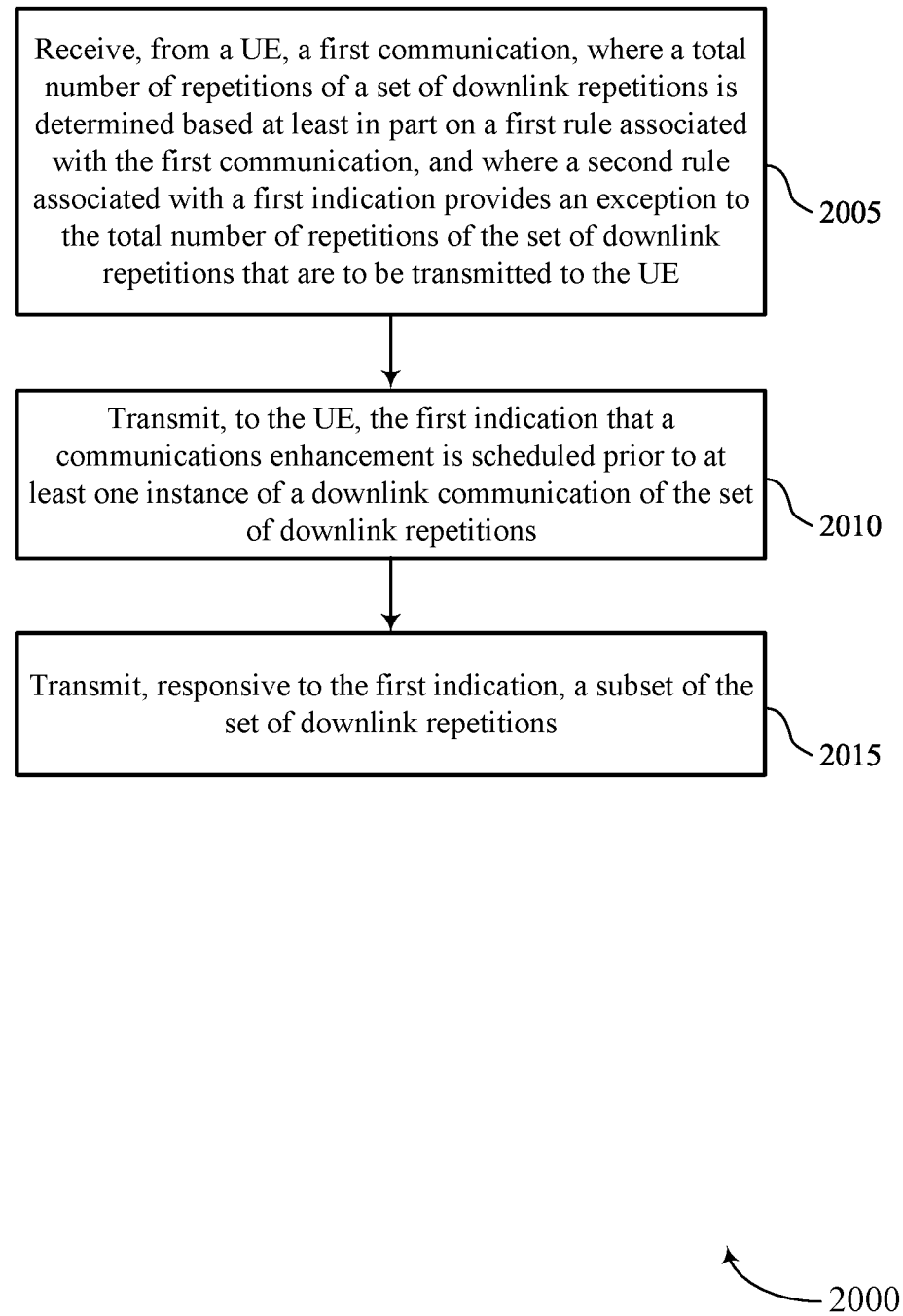

FIG. 20 shows a flowchart illustrating a method 2000 that supports downlink transmission repetition techniques in wireless communications in accordance with aspects of the present disclosure. The operations of the method 2000 may be implemented by a base station or its components as described herein. For example, the operations of the method 2000 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2005, the method may include receiving, from a UE, a first communication, where a total number of repetitions of a set of downlink repetitions is determined based on a first rule associated with the first communication, and where a second rule associated with a first indication provides an exception to the total number of repetitions of the set of downlink repetitions that are to be transmitted to the UE. The operations of 2005 may be performed in accordance with examples as disclosed herein. In some examples, aspects of the operations of 2005 may be performed by a downlink repetition manager 1140 as described with reference to FIG. 11.

At 2010, the method may include transmitting, to a UE, the first indication that a communications enhancement is scheduled prior to at least one instance of a downlink communication of the set of downlink repetitions. The operations of 2010 may be performed in accordance with examples as disclosed herein. In some examples, aspects of the operations of 2010 may be performed by an access enhancement manager 1125 as described with reference to FIG. 11.

At 2015, the method may include transmitting, responsive to the first indication, a subset of the set of downlink repetitions. The operations of 2015 may be performed in accordance with examples as disclosed herein. In some examples, aspects of the operations of 2015 may be performed by a downlink resource manager 1130 as described with reference to FIG. 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a user equipment, comprising: receiving, from a base station, a first indication that a communications enhancement is scheduled prior to at least one instance of a downlink communication of a random access procedure, wherein, in an absence of the first indication, the downlink communication is scheduled to be transmitted in a set of repetitions that includes two or more instances of the downlink communication that are associated with different downlink resources of a plurality of downlink resources; and monitoring, responsive to the first indication, a subset of the plurality of downlink resources for a subset of the set of repetitions of the downlink communication.

Aspect 2: The method of aspect 1, wherein the receiving the first indication comprises: receiving scheduling information for a channel state information reference signal (CSI-RS) that is to be measured at the UE during or before the random access procedure.

Aspect 3: The method of aspect 2, wherein the monitoring comprises: monitoring for a random access response message on the subset of the plurality of downlink resources based on the CSI-RS scheduling information, wherein the subset of the plurality of downlink resources is associated with fewer instances of the downlink communication than the plurality of downlink resources.

Aspect 4: The method of aspect 3, wherein the random access response message is a message-2 transmission, and wherein a message-4 downlink control channel message is transmitted subsequent to the message-2 transmission using fewer repetitions than a total number of repetitions of the set of repetitions.

Aspect 5: The method of aspect 1, wherein the first indication is a random access response from the base station that is transmitted responsive to a random access request of the UE, wherein the random access response schedules an SRS transmission from the UE.

Aspect 6: The method of aspect 5, wherein the downlink communication is monitored on the subset of the plurality of downlink resources based on the SRS transmission, and wherein the subset of the plurality of downlink resources is associated with fewer instances of the downlink communication than the plurality of downlink resources.

Aspect 7: The method of any of aspects 1 through 6, wherein a number of repetitions of the downlink communication that are monitored at the UE is modified responsive to the first indication based at least in part on a set of predefined rules for the number of repetitions of the downlink communication.

Aspect 8: The method of any of aspects 1 through 7, further comprising: receiving, from the base station, a system information communication that includes one or more parameters that identify a total number of repetitions of the set of repetitions that are to be monitored at the UE.

Aspect 9: The method of any of aspects 1 through 8, further comprising: transmitting a first communication to the base station, wherein a total number of repetitions of the set of repetitions is determined based at least in part on a first rule associated with the first communication, and wherein a second rule associated with the first indication provides an exception to the total number of repetitions of the set of repetitions that are to be monitored at the UE.

Aspect 10: The method of aspect 9, wherein the first rule indicates that the UE is to monitor for repetitions of the downlink communication when the first communication is transmitted using multiple repetitions, and the second rule indicates that the UE is to discontinue monitoring for multiple instances of the downlink communication when an initial access enhancement or a random access enhancement is present.

Aspect 11: The method of aspect 10, wherein the initial access enhancement or the random access enhancement is based on one or more channel measurements that are enabled by the reference signal transmission.

Aspect 12: The method of aspect 11, wherein a number of instances of the downlink communication that are to be transmitted is identified based at least in part on a parameter that is provided with system information that indicates the initial access enhancement or the random access enhancement.

Aspect 13: The method of any of aspects 1 through 12, wherein the subset of the set of repetitions of the downlink communication includes fewer repetitions than the set of repetitions, or no repetitions of the downlink communication subsequent to an initial transmission of the downlink communication.

Aspect 14: A method for wireless communication at a base station, comprising: transmitting, to a UE, a first indication that a communications enhancement is scheduled prior to at least one instance of a downlink communication of a random access procedure, wherein, in an absence of the first indication, the downlink communication is scheduled to be transmitted in a set of repetitions that includes two or more instances of the downlink communication that are associated with different downlink resources of a plurality of downlink resources; and transmitting, responsive to the first indication, a subset of the set of repetitions of the downlink communication using a subset of the plurality of downlink resources.

Aspect 15: The method of aspect 14, wherein the transmitting the first indication comprises: transmitting scheduling information for a channel state information reference signal (CSI-RS) that is to be measured at the UE during or before the random access procedure.

Aspect 16: The method of aspect 15, wherein the transmitting the subset of the set of repetitions comprises: transmitting a random access response message using the subset of the plurality of downlink resources based on the CSI-RS scheduling information, wherein the subset of the plurality of downlink resources is associated with fewer instances of the downlink communication than the plurality of downlink resources.

Aspect 17: The method of aspect 16, wherein the random access response message is a message-2 transmission, and wherein a message-4 downlink control channel message is transmitted subsequent to the message-2 transmission using fewer repetitions than a total number of repetitions of the set of repetitions.

Aspect 18: The method of aspect 14, wherein the first indication is a random access response from the base station that is transmitted responsive to a random access request of the UE, wherein the random access response schedules an SRS transmission from the UE.

Aspect 19: The method of aspect 18, wherein the downlink communication is transmitted on the subset of the plurality of downlink resources based on the SRS transmission, and wherein the subset of the plurality of downlink resources is associated with fewer instances of the downlink communication than the plurality of downlink resources.

Aspect 20: The method of any of aspects 14 through 19, wherein a number of repetitions of the downlink communication that are transmitted to the UE is modified responsive to the first indication based at least in part on a set of predefined rules for the number of repetitions of the downlink communication.

Aspect 21: The method of any of aspects 14 through 20, further comprising: transmitting a system information communication that includes one or more parameters that identify a total number of repetitions of the set of repetitions that are to be monitored at the UE.

Aspect 22: The method of any of aspects 14 through 21, further comprising: receiving, from the UE, a first communication, wherein a total number of repetitions of the set of repetitions is determined based at least in part on a first rule associated with the first communication, and wherein a second rule associated with the first indication provides an exception to the total number of repetitions of the set of repetitions that are to be transmitted to the UE.

Aspect 23: The method of aspect 22, wherein the first rule indicates that the UE is to monitor for repetitions of the downlink communication when the first communication is transmitted using multiple repetitions, and the second rule indicates that the UE is to discontinue monitoring for multiple instances of the downlink communication when an initial access enhancement or a random access enhancement is present.

Aspect 24: The method of aspect 23, wherein the initial access enhancement or the random access enhancement is based on one or more channel measurements that are enabled by the reference signal transmission.

Aspect 25: The method of aspect 24, wherein a number of instances of the downlink communication that are to be transmitted is identified based at least in part on a parameter that is provided with system information that indicates the initial access enhancement or the random access enhancement.

Aspect 26: The method of any of aspects 14 through 25, wherein the subset of the set of repetitions of the downlink communication includes fewer repetitions than the set of repetitions, or no repetitions of the downlink communication subsequent to an initial transmission of the downlink communication.

Aspect 27: An apparatus for wireless communication at a user equipment, comprising a processor; memory coupled with the processor; and instructions stored in the memory and executable by the processor to cause the apparatus to perform a method of any of aspects 1 through 13.

Aspect 28: An apparatus for wireless communication at a user equipment, comprising at least one means for performing a method of any of aspects 1 through 13.

Aspect 29: A non-transitory computer-readable medium storing code for wireless communication at a user equipment, the code comprising instructions executable by a processor to perform a method of any of aspects 1 through 13.

Aspect 30: An apparatus for wireless communication at a base station, comprising a processor; memory coupled with the processor; and instructions stored in the memory and executable by the processor to cause the apparatus to perform a method of any of aspects 14 through 26.

Aspect 31: An apparatus for wireless communication at a base station, comprising at least one means for performing a method of any of aspects 14 through 26.

Aspect 32: A non-transitory computer-readable medium storing code for wireless communication at a base station, the code comprising instructions executable by a processor to perform a method of any of aspects 14 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, prior to at least one instance of two or more instances of a downlink communication of a random access procedure that are expected to be received at the UE, a first indication of a termination of the downlink communication, wherein the downlink communication is scheduled to be transmitted in a set of repetitions that includes the two or more instances of the downlink communication that are associated with different downlink resources of a plurality of downlink resources and the first indication of the termination indicates that at least one instance of the two or more instances will not be transmitted; and
   monitoring, responsive to the first indication, a subset of the plurality of downlink resources for a subset of the set of repetitions of the downlink communication.

2. The method of claim 1, wherein the receiving the first indication comprises:
   receiving scheduling information for a channel state information reference signal (CSI-RS) that is to be measured at the UE during or before the random access procedure.

3. The method of claim 2, wherein the monitoring comprises:
   monitoring for a random access response message on the subset of the plurality of downlink resources based at least in part on the scheduling information, wherein the subset of the plurality of downlink resources is associated with fewer instances of the downlink communication than the plurality of downlink resources.

4. The method of claim 3, wherein the random access response message is a message-2 transmission, and wherein a message-4 downlink control channel message is transmitted subsequent to the message-2 transmission using fewer repetitions than a total number of repetitions of the set of repetitions.

5. The method of claim 1, wherein the first indication is a random access response that is transmitted responsive to a random access request of the UE, wherein the random access response schedules a sounding reference signal (SRS) transmission from the UE.

6. The method of claim 5, wherein the downlink communication is monitored on the subset of the plurality of downlink resources based on the SRS transmission, and wherein the subset of the plurality of downlink resources is associated with fewer instances of the downlink communication than the plurality of downlink resources.

7. The method of claim 1, wherein a number of repetitions of the downlink communication that are monitored at the UE is modified responsive to the first indication based at least in part on a set of predefined rules for the number of repetitions of the downlink communication.

8. The method of claim 1, further comprising:
   receiving a system information communication that includes one or more parameters that identify a total number of repetitions of the set of repetitions that are to be monitored at the UE.

9. The method of claim 1, further comprising:
transmitting a first communication to a network entity, wherein a total number of repetitions of the set of repetitions is determined based at least in part on a first rule associated with the first communication, and wherein a second rule associated with the first indication provides an exception to the total number of repetitions of the set of repetitions that are to be monitored at the UE.

10. The method of claim 9, wherein the first rule indicates that the UE is to monitor for repetitions of the downlink communication when the first communication is transmitted using multiple repetitions, and the second rule indicates that the UE is to discontinue monitoring for multiple instances of the downlink communication when an initial access enhancement or a random access enhancement is present.

11. The method of claim 10, wherein the initial access enhancement or the random access enhancement is based on one or more channel measurements that are enabled by a reference signal transmission.

12. The method of claim 11, wherein a number of instances of the downlink communication that are to be transmitted is identified based at least in part on a parameter that is provided with system information that indicates the initial access enhancement or the random access enhancement.

13. The method of claim 1, wherein the subset of the set of repetitions of the downlink communication includes fewer repetitions than the set of repetitions, or no repetitions of the downlink communication subsequent to an initial transmission of the downlink communication.

14. A method for wireless communication at a network entity, comprising:
transmitting, to a user equipment (UE) prior to at least one instance of two or more instances of a downlink communication of a random access procedure that are expected to be transmitted to the UE, a first indication of a termination of the downlink communication, wherein the downlink communication is scheduled to be transmitted in a set of repetitions that includes the two or more instances of the downlink communication that are associated with different downlink resources of a plurality of downlink resources and the first indication of the termination indicates that at least one instance of the two or more instances will not be transmitted; and
transmitting, responsive to the first indication, a subset of the set of repetitions of the downlink communication using a subset of the plurality of downlink resources.

15. The method of claim 14, wherein the transmitting the first indication comprises:
transmitting scheduling information for a channel state information reference signal (CSI-RS) that is to be measured at the UE during or before the random access procedure.

16. The method of claim 15, wherein the transmitting the subset of the set of repetitions comprises:
transmitting a random access response message using the subset of the plurality of downlink resources based on the scheduling information, wherein the subset of the plurality of downlink resources is associated with fewer instances of the downlink communication than the plurality of downlink resources.

17. The method of claim 14, wherein the first indication is a random access response from the network entity that is transmitted responsive to a random access request of the UE, wherein the random access response schedules a sounding reference signal (SRS) transmission from the UE.

18. The method of claim 14, wherein a number of repetitions of the downlink communication that are transmitted to the UE is modified responsive to the first indication based at least in part on a set of predefined rules for the number of repetitions of the downlink communication.

19. The method of claim 14, further comprising:
transmitting a system information communication that includes one or more parameters that identify a total number of repetitions of the set of repetitions that are to be monitored at the UE.

20. The method of claim 14, further comprising:
receiving, from the UE, a first communication, wherein a total number of repetitions of the set of repetitions is determined based at least in part on a first rule associated with the first communication, and wherein a second rule associated with the first indication provides an exception to the total number of repetitions of the set of repetitions that are to be transmitted to the UE.

21. The method of claim 20, wherein the first rule indicates that the UE is to monitor for repetitions of the downlink communication when the first communication is transmitted using multiple repetitions, and the second rule indicates that the UE is to discontinue monitoring for multiple instances of the downlink communication when an initial access enhancement or a random access enhancement is present.

22. The method of claim 21, wherein the initial access enhancement or the random access enhancement is based on one or more channel measurements that are enabled by a reference signal transmission.

23. The method of claim 14, wherein the subset of the set of repetitions of the downlink communication includes fewer repetitions than the set of repetitions, or no repetitions of the downlink communication subsequent to an initial transmission of the downlink communication.

24. A user equipment (UE), comprising:
one or more memories storing processor-executable code; and
one or more processors coupled with the one or more memories and individually or collectively operable to execute the code to cause the UE to:
receive, prior to at least one instance of two or more instances of a downlink communication of a random access procedure that are expected to be received at the UE, a first indication of a termination of the downlink communication, wherein the downlink communication is scheduled to be transmitted in a set of repetitions that includes the two or more instances of the downlink communication that are associated with different downlink resources of a plurality of downlink resources and the first indication of the termination indicates that at least one instance of the two or more instances will not be transmitted; and
monitor, responsive to the first indication, a subset of the plurality of downlink resources for a subset of the set of repetitions of the downlink communication.

25. The UE of claim 24, wherein, to transmit the first indication, the one or more processors are individually or collectively further operable to execute the code to cause the UE to:
receive scheduling information for a channel state information reference signal (CSI-RS) that is to be measured at the UE during or before the random access procedure.

26. The UE of claim 25, wherein the one or more processors are individually or collectively further operable to execute the code to cause the UE to:
monitor for a random access response message on the subset of the plurality of downlink resources based on the scheduling information, wherein the subset of the plurality of downlink resources is associated with fewer instances of the downlink communication than the plurality of downlink resources.

27. The UE of claim 24, wherein the first indication is a random access response that is transmitted responsive to a random access request of the UE, wherein the random access response schedules a sounding reference signal (SRS) transmission from the UE.

28. A network entity, comprising:
one or more memories storing processor-executable code; and
one or more processors coupled with the one or more memories and individually or collectively operable to execute the code to cause the network entity to:
transmit, to a user equipment (UE) prior to at least one instance of two or more instances of a downlink communication of a random access procedure that are expected to be transmitted to the UE, a first indication of a termination of the downlink communication, wherein the downlink communication is scheduled to be transmitted in a set of repetitions that includes the two or more instances of the downlink communication that are associated with different downlink resources of a plurality of downlink resources and the first indication of the termination indicates that at least one instance of the two or more instances will not be transmitted; and
transmit, responsive to the first indication, a subset of the set of repetitions of the downlink communication using a subset of the plurality of downlink resources.

29. The network entity of claim 28, wherein the one or more processors are individually or collectively further operable to execute the code to cause the network entity to:
transmit scheduling information for a channel state information reference signal (CSI-RS) that is to be measured at the UE during or before the random access procedure.

30. The network entity of claim 29, wherein the one or more processors are individually or collectively further operable to execute the code to cause the network entity to:
transmit a random access response message using the subset of the plurality of downlink resources based on the scheduling information, wherein the subset of the plurality of downlink resources is associated with fewer instances of the downlink communication than the plurality of downlink resources.

* * * * *